US009032089B2

(12) United States Patent
Aybay

(10) Patent No.: US 9,032,089 B2
(45) Date of Patent: May 12, 2015

(54) METHODS AND APPARATUS FOR PATH SELECTION WITHIN A NETWORK BASED ON FLOW DURATION

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 679 days.

(21) Appl. No.: 13/044,023

(22) Filed: Mar. 9, 2011

(65) Prior Publication Data

US 2012/0233349 A1  Sep. 13, 2012

(51) Int. Cl.
*G06F 15/16* (2006.01)
*H04L 12/863* (2013.01)
*H04L 12/851* (2013.01)

(52) U.S. Cl.
CPC ........ *H04L 47/6295* (2013.01); *H04L 47/2441* (2013.01)

(58) Field of Classification Search
USPC .......................................... 709/234; 370/230
See application file for complete search history.

(56) References Cited

U.S. PATENT DOCUMENTS

| 5,457,687 | A | 10/1995 | Newman |
| 5,926,473 | A | 7/1999 | Gridley |
| 5,987,008 | A | 11/1999 | Simpson et al. |
| 5,987,028 | A | 11/1999 | Yang et al. |
| 5,991,295 | A | 11/1999 | Tout et al. |
| 6,049,546 | A | 4/2000 | Ramakrishnan |
| 6,073,089 | A | 6/2000 | Baker et al. |
| 6,324,165 | B1 | 11/2001 | Fan et al. |
| 6,370,145 | B1 | 4/2002 | Dally et al. |
| 6,389,468 | B1 * | 5/2002 | Muller et al. ................. 709/226 |
| 6,438,107 | B1 | 8/2002 | Somiya et al. |
| 6,512,747 | B1 | 1/2003 | Umeuchi et al. |
| 6,618,357 | B1 | 9/2003 | Geyer et al. |
| 6,621,828 | B1 | 9/2003 | Filed et al. |
| 6,657,962 | B1 | 12/2003 | Barri et al. |
| 6,798,746 | B1 * | 9/2004 | Kloth et al. ................... 370/235 |
| 6,856,622 | B1 | 2/2005 | Calamvokis et al. |

(Continued)

FOREIGN PATENT DOCUMENTS

| EP | 1 133 110 A2 | 9/2001 |
| EP | 1 653 685 A1 | 5/2006 |

(Continued)

OTHER PUBLICATIONS

European Search Report for European Application No. EP 11 18 8568, mailed Jun. 20, 2012.

(Continued)

*Primary Examiner* — Duyen Doan
(74) *Attorney, Agent, or Firm* — Cooley LLP

(57) ABSTRACT

In some embodiments, an apparatus includes a forwarding module that is configured to receive a group of first data packets. The forwarding module is configured to modify a data flow value in response to receiving each first data packet. The forwarding module is also configured to store each first data packet in a first output queue based on the data flow value not crossing a data flow threshold after being modified. Furthermore, the forwarding module is configured to receive a second data packet. The forwarding module is configured to modify the data flow value in response to receiving the second data packet, such that the data flow value crosses the data flow threshold. The forwarding module is configured to store the second data packet in a second output queue based on the data flow value having crossed the data flow threshold.

20 Claims, 7 Drawing Sheets

(56) References Cited

U.S. PATENT DOCUMENTS

| | | |
|---|---|---|
| 6,944,173 B1 | 9/2005 | Jones et al. |
| 6,973,032 B1 | 12/2005 | Casley et al. |
| 6,977,932 B1 | 12/2005 | Hauck |
| 6,986,161 B2 | 1/2006 | Billhartz |
| 7,027,457 B1 | 4/2006 | Chiussi et al. |
| 7,042,842 B2 | 5/2006 | Paul et al. |
| 7,046,631 B1 | 5/2006 | Giroux et al. |
| 7,061,862 B2 | 6/2006 | Horiguchi et al. |
| 7,075,934 B2 | 7/2006 | Chiussi et al. |
| 7,085,846 B2 | 8/2006 | Jenne et al. |
| 7,173,931 B2 | 2/2007 | Chao et al. |
| 7,185,368 B2 | 2/2007 | Copeland, III |
| 7,230,947 B1 | 6/2007 | Huber et al. |
| 7,233,568 B2 | 6/2007 | Goodman et al. |
| 7,234,168 B2 | 6/2007 | Gupta et al. |
| 7,269,666 B1 | 9/2007 | Leitner et al. |
| 7,277,429 B2 | 10/2007 | Norman et al. |
| 7,283,471 B2 | 10/2007 | Gutierrez et al. |
| 7,324,442 B1 | 1/2008 | Pan et al. |
| 7,327,680 B1 | 2/2008 | Kloth |
| 7,372,813 B1 | 5/2008 | Cimino et al. |
| 7,391,736 B2 | 6/2008 | Na et al. |
| 7,403,524 B2 | 7/2008 | Hill |
| 7,424,744 B1 | 9/2008 | Wu et al. |
| 7,430,175 B2 | 9/2008 | Dropps et al. |
| 7,440,448 B1 | 10/2008 | Lu et al. |
| 7,457,245 B2 | 11/2008 | McAlpine et al. |
| 7,519,860 B2 | 4/2009 | Hatonen et al. |
| 7,540,025 B2 | 5/2009 | Tzadikario |
| 7,543,052 B1 | 6/2009 | Cesa Klein |
| 7,564,869 B2 | 7/2009 | Cafiero et al. |
| 7,643,418 B1 | 1/2010 | Varier et al. |
| 7,701,849 B1 | 4/2010 | Ma |
| 7,719,982 B2 | 5/2010 | Varma |
| 8,154,996 B2 | 4/2012 | Godbole et al. |
| 8,160,072 B1 | 4/2012 | Gnanasekaran et al. |
| 8,213,308 B2 | 7/2012 | Godbole et al. |
| 8,218,442 B2 | 7/2012 | Godbole et al. |
| 8,228,797 B1 | 7/2012 | Utley et al. |
| 8,254,255 B2 | 8/2012 | Thomas |
| 8,588,242 B1* | 11/2013 | Izenberg et al. ............... 370/412 |
| 2002/0057699 A1 | 5/2002 | Roberts |
| 2002/0064170 A1 | 5/2002 | Siu et al. |
| 2002/0075883 A1 | 6/2002 | Dell et al. |
| 2002/0080789 A1 | 6/2002 | Henderson et al. |
| 2002/0118692 A1 | 8/2002 | Oberman et al. |
| 2002/0154637 A1 | 10/2002 | Keller-Tuberg |
| 2002/0167950 A1 | 11/2002 | Chang et al. |
| 2003/0005145 A1 | 1/2003 | Bullard |
| 2003/0023733 A1 | 1/2003 | Lingafelt et al. |
| 2003/0026267 A1 | 2/2003 | Oberman et al. |
| 2003/0026287 A1 | 2/2003 | Mullendore et al. |
| 2003/0035432 A1 | 2/2003 | Sreejith et al. |
| 2003/0058880 A1 | 3/2003 | Sarkinen et al. |
| 2003/0063348 A1 | 4/2003 | Posey |
| 2003/0218977 A1 | 11/2003 | Pan et al. |
| 2004/0001433 A1 | 1/2004 | Gram et al. |
| 2004/0013124 A1 | 1/2004 | Peebles et al. |
| 2004/0125815 A1* | 7/2004 | Shimazu et al. ............... 370/411 |
| 2004/0165598 A1 | 8/2004 | Shrimali et al. |
| 2004/0213152 A1* | 10/2004 | Matuoka et al. ............... 370/230 |
| 2005/0036502 A1 | 2/2005 | Blanc et al. |
| 2005/0039104 A1* | 2/2005 | Shah et al. ............... 714/776 |
| 2005/0108444 A1 | 5/2005 | Flauaus et al. |
| 2005/0111460 A1 | 5/2005 | Sahita |
| 2005/0138238 A1 | 6/2005 | Tierney et al. |
| 2005/0138243 A1 | 6/2005 | Tierney et al. |
| 2005/0157647 A1* | 7/2005 | Sterne et al. ............... 370/235 |
| 2005/0210533 A1 | 9/2005 | Copeland et al. |
| 2005/0226156 A1 | 10/2005 | Keating et al. |
| 2005/0249214 A1 | 11/2005 | Peng |
| 2005/0276263 A1 | 12/2005 | Suetsugu et al. |
| 2006/0067225 A1 | 3/2006 | Fedorkow et al. |
| 2006/0104298 A1 | 5/2006 | McAlpine et al. |
| 2006/0120289 A1 | 6/2006 | Cunningham |
| 2006/0123480 A1 | 6/2006 | Oh et al. |
| 2006/0146703 A1 | 7/2006 | Cha et al. |
| 2006/0272018 A1 | 11/2006 | Fouant |
| 2006/0285548 A1 | 12/2006 | Hill et al. |
| 2007/0064617 A1 | 3/2007 | Reves |
| 2007/0067438 A1 | 3/2007 | Goranson et al. |
| 2007/0086464 A1 | 4/2007 | Somashekhar |
| 2007/0094729 A1 | 4/2007 | Hoefelmeyer et al. |
| 2007/0118909 A1 | 5/2007 | Hertzog et al. |
| 2007/0150949 A1 | 6/2007 | Futamura et al. |
| 2007/0180526 A1 | 8/2007 | Copeland, III |
| 2007/0192861 A1 | 8/2007 | Varghese et al. |
| 2007/0240207 A1 | 10/2007 | Belakhdar et al. |
| 2007/0268830 A1 | 11/2007 | Li et al. |
| 2008/0028096 A1 | 1/2008 | Henderson et al. |
| 2008/0028467 A1 | 1/2008 | Kommareddy et al. |
| 2008/0080548 A1 | 4/2008 | Mullendore et al. |
| 2008/0082977 A1 | 4/2008 | Araujo et al. |
| 2008/0151863 A1 | 6/2008 | Lawrence et al. |
| 2008/0192764 A1* | 8/2008 | Arefi et al. ............... 370/412 |
| 2008/0198746 A1 | 8/2008 | Kwan et al. |
| 2008/0253289 A1 | 10/2008 | Naven et al. |
| 2008/0259798 A1 | 10/2008 | Loh et al. |
| 2008/0263661 A1 | 10/2008 | Bouzida |
| 2008/0285449 A1 | 11/2008 | Larsson et al. |
| 2008/0291915 A1* | 11/2008 | Foschiano ............... 370/392 |
| 2009/0003212 A1 | 1/2009 | Kwan et al. |
| 2009/0077663 A1 | 3/2009 | Sun et al. |
| 2009/0300209 A1 | 12/2009 | Elzur |
| 2010/0061238 A1 | 3/2010 | Godbole et al. |
| 2010/0061239 A1 | 3/2010 | Godbole et al. |
| 2010/0061390 A1 | 3/2010 | Godbole et al. |
| 2010/0085891 A1 | 4/2010 | Kind et al. |
| 2010/0158031 A1 | 6/2010 | Thomas et al. |
| 2010/0165843 A1 | 7/2010 | Thomas |
| 2011/0154132 A1 | 6/2011 | Aybay |
| 2011/0267942 A1 | 11/2011 | Aybay et al. |
| 2011/0310739 A1 | 12/2011 | Aybay et al. |
| 2012/0140626 A1 | 6/2012 | Anand et al. |
| 2012/0195203 A1 | 8/2012 | Godbole et al. |
| 2012/0233349 A1 | 9/2012 | Aybay et al. |
| 2012/0269065 A1 | 10/2012 | Godbole et al. |
| 2012/0275307 A1 | 11/2012 | Godbole et al. |

FOREIGN PATENT DOCUMENTS

| | | |
|---|---|---|
| EP | 1 892 905 A1 | 2/2008 |
| EP | 2 040 420 A1 | 3/2009 |
| EP | 2 180 644 A1 | 4/2010 |
| EP | 2 461 529 A1 | 6/2012 |
| GB | 2 361 139 A | 10/2001 |
| WO | WO 97/04546 | 2/1997 |

OTHER PUBLICATIONS

F.K. Liotopoulos et al., "A Modular, 160 Gbps ATM Switch Architecture for Multimedia Networking Support, based on a 3-Stage Clos Network," Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

William J. Daily, "Virtual-Channel Flow Control," IEEE Transactions on Parallel and Distributed Systems, vol. 3, No. 2, Mar. 1992, pp. 194-205.

Mohammad Alizadeh et al. "Data Center TCP (DCTCP)" SIGCOMM'10, Aug. 30-Sep. 3, 2010, New Delhi, India, Copyright 2010 ACM 978-1-4503-0201-Feb. 10, 2008 (12 pages).

Cyriel Minkenberg et al. "Adaptive Routing for Convergence Enhanced Ethernet," In Proc Int Conf on High Performance Switching and Routing (HPSR), pp. 1-8, Jun. 22-24, 2009.

Office Action mailed Apr. 29, 2010 for U.S. Appl. No. 12/343,728 (21 pages).

Office Action mailed Oct. 15, 2010 for U.S. Appl. No. 12/343,728 (22 pages).

Office Action mailed May 2, 2011 for U.S. Appl. No. 12/343,728 (22 pgs).

(56) References Cited

OTHER PUBLICATIONS

Final Office Action mailed Oct. 7, 2011 for U.S. Appl. No. 12/343,728 (25 pgs).
Office Action mailed Mar. 26, 2010 for U.S. Appl. No. 12/242,224 (17 pages).
Office Action mailed Sep. 17, 2010 for U.S. Appl. No. 12/242,224 (9 pages).
Office Action mailed Aug. 9, 2011 for U.S. Appl. No. 12/242,224 (7 pages).
Office Action mailed Mar. 29, 2010 for U.S. Appl. No. 12/242,230 (11 pages).
Office Action mailed Sep. 17, 2010 for U.S. Appl. No. 12/242,230 (16 pages).
Office Action mailed Mar. 17, 2011 for U.S. Appl. No. 12/242,230 (11 pages).
Office Action mailed Oct. 6, 2011 for U.S. Appl. No. 12/242,230 (19 pages).
Office Action mailed May 23, 2011 for U.S. Appl. No. 12/558,118 (6 pgs).
Office Action mailed May 11, 2010 for U.S. Appl. No. 12/345,490 (12 pages).
Office Action mailed Oct. 15, 2010 for U.S. Appl. No. 12/345,490 (14 pages).
Office Action mailed Apr. 1, 2011 for U.S. Appl. No. 12/345,490 (14 pages).
Office Action mailed Aug. 19, 2011 for U.S. Appl. No. 12/345,490 (14 pages).
U.S. Appl. No. 13/594,385, filed Aug. 24, 2012, entitled "Flow-Control in a Switch Fabric".
Office Action mailed Mar. 26, 2012, for U.S. Appl. No. 12/646,114.
Final Office Action mailed Jul. 19, 2012, for U.S. Appl. No. 12/646,114.
Non-Final Office Action for U.S. Appl. No. 12/771,413, mailed May 24, 2012.
Office Action for U.S. Appl. No. 12/771,413, mailed May 24, 2012.
U.S. Appl. No. 12/859,015, filed Aug. 18, 2010, entitled "Fibre Channel Credit-Based Link Flow Control Overlay Onto Fibre Channel Over Ethernet" (41 pgs).
Office Action Mailed Nov. 7, 2012 for U.S. Appl. No. 12/859,015.
Office Action Mailed Sep. 27, 2012 for U.S. Appl. No. 12/820,797.
Office Action mailed Nov. 27, 2012 for U.S. Appl. No. 13/541,080.
U.S. Appl. No. 12/953,149, filed Nov. 23, 2010, entitled "Methods and Apparatus for Destination Based Hybrid Load Balancing Within a Switch Fabric" (49 pgs).
Search Report for European Application No. 09170041.9, mailed Nov. 23, 2009 (8 pages).
Examination Report for European Application No. 09170041.9, mailed Mar. 13, 2012 (7 pages).
Partial Search Report for European Application No. 11188568.7, mailed Feb. 22, 2012 (5 pgs).
Extended Search Report for European Application No. 12158266.2, mailed Jun. 29, 2012.
Examination Report for European Application No. 09170041.9, mailed Mar. 22, 2013 (4 pages).
Examination Report for European Application No. 12158266.2, mailed Aug. 8, 2013 (6 pages).
Chinese Office Action mailed Jul. 14, 2014 for Chinese Application No. 201210228495.4.
Examination Report for European Application No. 12158266.2, mailed Aug. 8, 2014 (4 pages).
Chinese Office Action mailed Feb. 27, 2015 for Chinese Application No. 201210228495.4.

* cited by examiner

| Queue Database 325 ||
|---|---|
| Data Flow ID 350 | Output Queue ID 360 |
| 40 | 330 |
| 42 | 340 |
| 44 | 340 |

METHODS AND APPARATUS FOR PATH SELECTION WITHIN A NETWORK BASED ON FLOW DURATION

BACKGROUND

Some embodiments described herein relate generally to forwarding network traffic in data centers, and, in particular, to methods and apparatus for classifying data packets into queuing classes based on the duration of a data flow in a data center.

In some instances, separate networks are built to deliver traffic for separate applications. For example, many high performance computing applications or high frequency trading systems use dedicated low latency networks. This approach of separate networks, however, is costly when the demand for separate networks increases. Alternatively, some known data centers have multiple network interfaces each dedicated to a different type of data flow (e.g., bulk data transfers, storage access, control communication traffic). Such an approach, however, is typically unpractical or uneconomic in a data center that has to deploy server virtualization at a large scale. Some other known data centers classify traffic flows into different traffic classes such that traffic for these classes can be buffered independently at the data centers. Classifying traffic flows into different traffic classes, however, does not guarantee the desired requirement of each flow is met because either the behavior of a data flow (e.g., duration) may be unknown or unavailable to the data center when the data flow is classified upon entering the data center, or a single application may produce multiple different types of data flows that have differing latency and throughput requirements. Also, information on the class of service requirement for a given data flow (e.g., latency requirement) may not be included in the packets (e.g., in a packet header) of the data flow.

Accordingly, a need exists for methods and apparatus that can forward data flows of different applications and meet the desired requirement(s) associated with each given flow without introducing unnecessary complications.

SUMMARY

In some embodiments, an apparatus includes a forwarding module that is configured to receive a group of first data packets. The forwarding module is configured to modify a data flow value in response to receiving each first data packet. The forwarding module is also configured to store each first data packet in a first output queue based on the data flow value not crossing a data flow threshold after being modified. Furthermore, the forwarding module is configured to receive a second data packet. The forwarding module is configured to modify the data flow in response to receiving the second data packet, such that the data flow value crosses the data flow threshold. The forwarding module is configured to store the second data packet in a second output queue based on the data flow value having crossed the data flow threshold.

DETAILED DESCRIPTION

Figure 1:
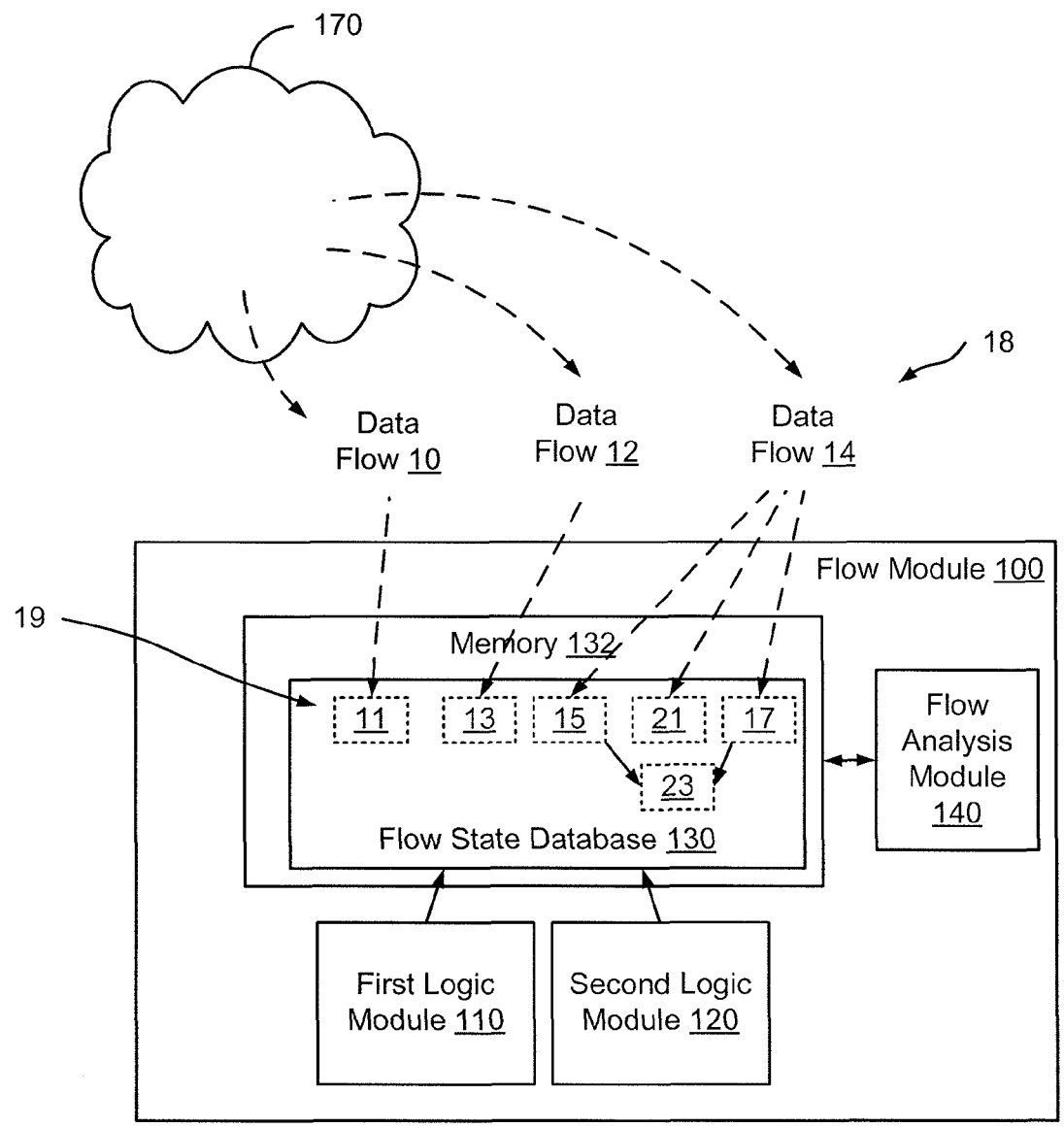
FIG. 1 is a schematic diagram that illustrates a flow module configured to process flow state values associated with data flows, according to an embodiment.

FIG. 1 is a schematic diagram that illustrates a flow module configured to process flow state values associated with data flows, according to an embodiment. Specifically, the flow module 100 is configured to process flow state value 11, flow state value 13, and flow state values 15, 17, 21, and 23, which are respectively associated with data flow 10, data flow 12, and data flow 14 (as represented by the dashed arrows shown in FIG. 1). Flow state values 11, 13 and 15 can be referred to collectively as flow state values 19. Data flows 10, 12 and 14 can be referred to collectively as data flows 18.

Each of the data flows 18 can be defined by, for example, a group of packets such as Ethernet packets, session control protocol packets, and/or other types of data packets. The packets can have a header, a payload, and/or a trailer that is defined based on, for example, an Internet protocol (IP)-based protocol associated with any layer of the open systems interconnection (OSI) model. In some embodiments, the data flows 18 can be referred to as data streams, or as packet streams. In some embodiments, one or more of the data flows 18 can be associated with a communication session between two communication devices (e.g., a computer server, a network router, a personal computer, etc.), namely, sent from a source device to a destination device. For example, data flow 10 can define a portion of a first communication session sent from a computer server (not shown) to a network router (not shown), and data flow 12 can define a portion of a second communication session sent from a mobile Internet device (not shown) to a personal laptop (not shown), which is different from the first communication session. In these examples, the flow module 100 can be any type of entity (or included in any entity) configured to receive and process data. Although not shown, in some embodiments, the flow module 100 can be associated with (e.g., included in), for example, one or more portions of a distributed switch/router (such as the switch 300 shown in FIG. 3) that is located at the edge of a data communication network (e.g., network 170, which is described in detail below), or within a multi-stage switch fabric. More details about a switch fabric are described with respect to FIG. 3.

In some embodiments, one or more portions of the data flows 18 can be received in parallel or in serial. For example, a first packet from data flow 12 can be received at the flow module 100 via a network interface card (not shown) of the flow module 100, and a second packet from data flow 14 can later be received (in series) at the flow module 100 via the same network interface card. In some embodiments, a first packet from data flow 12 can be received at the flow module 100 via a first network interface card (not shown) of the flow module 100 during a time period, and a second packet from data flow 14 can be received during the same time period (in parallel) at the flow module 100 via a second network interface card.

The flow state values 19 can be used to identify one or more characteristics of the data flows 18. In some embodiments, one or more flow state values 19 can represent a data packet counter for one or more data flows 18, which records the number of packets included in the data flow that have been received at flow module 100. For example, flow state value 11 can be used to represent a data packet counter for data flow 10, which records the number of packets of data flow 10 that have been received at flow module 100. In some embodiments, flow state values 19 representing relatively high numbers of packets of a data flow can indicate that the data flow is associated with a high throughput communication connection (e.g., transfer of a large text file, bulk data, etc.). In contrast, flow state values 19 representing relatively low numbers of packets of a data flow can indicate that the data flow is associated with a latency-sensitive communication connection (e.g., video streaming, control communication, etc.).

In some embodiments, one or more flow state values 19 can represent a timestamp of the last (i.e., most recent) packet of one or more data flows 18. This timestamp can record the time when the last packet of the data flow is received at flow module 100. For example, flow state value 13 can be used to represent the timestamp of the last packet of data flow 12. Alternatively, one or more flow state values 19 can represent a timer that records the total amount of time between receiving the first packet and receiving the last (i.e., most recent) packet of one or more data flows 18 at flow module 100. For example, flow state value 15 can be used to represent a timer that records the total amount of time between receiving the first packet and receiving the last packet of data flow 14 at flow module 100.

In some embodiments, one or more flow state values 19 can represent a data packet size counter for one or more data flows 18, which records the total size (e.g., in bits) of all packets included in the data flow that have been received at flow module 100. For example, flow state value 17 can be used to represent a data packet size counter for data flow 14, which records the total size of all packets of data flow 14 that have been received at flow module 100.

In some embodiments, one or more flow state values 19 can represent an average bandwidth counter for one or more data flows 18, which records the average bandwidth occupied by packets of the data flow that have been received at flow module 100. Such an average bandwidth counter can be determined based on one or more other flow state values that are associated with the data flow. Specifically, the average bandwidth (e.g., in bits/second) of a data flow can be calculated by dividing the total size (e.g., in bits) of all packets included in the data flow by the total amount of time (e.g., in seconds) between receiving the first packet and receiving the last packet of the data flow. As shown in the example of FIG. 1, flow state value 23 can be used to represent an average bandwidth counter for data flow 14, which can be calculated based on the total size of all packets included in data flow 14 (e.g., represented by flow state value 17) and the total amount of time between receiving the first packet and receiving the last packet of data flow 14 (e.g., represented by flow state value 15). Alternatively, the average bandwidth of a data flow can be calculated using a cumulative moving average function or exponential moving average function.

One or more of the flow state values 19 can be defined by (e.g., modified by) a first logic module 110 and/or a second logic module 120. For example, the first logic module 110 can be configured to change (e.g., replace, delete, increment, decrement) flow state value 13 in response to a packet being received at the flow module 100 and associated with data flow 12. In some embodiments, the flow state value 13 can be changed by the first logic module 110 based on an algorithm. In some embodiments, the flow state value 13 can be changed by the second logic module 120 based on a different algorithm than that used by the first logic module 110. In such instances, the operation of the second logical module 120 can be independent of the operation of the first logic module 110. In some other embodiments, the flow state value 13 can be changed by the second logic module 120 based on an algorithm associated with that used by the first logic module 110. In such instances, the operation of the second logic module 120 can be associated with the operation of the first logic module 110. The first logic module 110 can be, for example, a flow state advancement module and the second logic module 120 can be, for example, a flow state timing module. More details related to a flow state advancement module and a flow state timing module are described in connection with FIG. 2.

In some embodiments, packets that define each data flow 18 can be identified by the flow module 100 as being associated with a respective data flow 18 based on a signature. For example, each of the packets that define data flow 12 can include a common signature that is different than a common signature of each of the packets that define data flow 14. Accordingly, a packet can be identified as a packet associated with data flow 12 rather than other data flows based on a signature of the packet that is the same as the signatures of other packets included in data flow 12. The signatures can also be referred to herein as flow signatures, or data flow IDs. For example, the signature can be defined by (or based on) bit values of at least a portion (e.g., a header portion) of a packet. In some embodiments, one or more of the data flows 18 can have a signature associated with a source identifier (i.e., an identifier that specifies a source device of the communication session) of the data flow(s) 18 and/or a destination identifier (i.e., an identifier that specifies a destination device of the communication session) of the data flow(s) 18. In some embodiments, a signature can be based on a portion of a header (e.g., a layer-2 (L2) portion of a header, a layer-3 (L3) portion of a header, a layer-4 (L4) portion of a header). For example, a packet can be identified as a packet associated with data flow 12 based on a source identifier and a destination identifier that are included in an L3 portion and an L4 portion of a header of the packet.

In some embodiments, one or more of the flow state values 19 can be defined (or changed) by the first logic module 110 and/or the second logic module 120 based on a signature of a packet that is received at the flow module 100. More specifically, one or more of the flow state values 19 can be defined (or changed) based on a received packet, which is associated with the specific data flow 18 based on a signature of the packet. For example, flow state value 15 can be used to represent a data packet counter for data flow 14, flow state value 17 can be used to represent a data packet size counter for data flow 14, and flow state value 21 can be used to represent the timestamp when the last packet of data flow 14 is received at flow module 100. As a result, when a packet of data flow 14 (a packet associated with data flow 14 based on a signature of the packet) is received at flow module 100, flow state value 15 is incremented by one by the first logic module 110 (e.g., a flow state advancement module), flow state value 17 is incremented by the size of the received packet by the first logic module 110, and flow state value 21 is updated with the timestamp of the received packet by the second logic module 120 (e.g., a flow state timing module). In such an example, the operation of the first logic module 110 is associated with the operation of the second logic module 120. Specifically, the two logic modules are triggered by the same event (i.e., receiving a packet of data flow 14) to update three flow state values respectively.

In some embodiments, one or more of the flow state values 19 can be configured to trigger an action (e.g., an analysis, sending of a notification) when a state condition is satisfied, or unsatisfied, based on the flow state value(s) 19. For example, one or more flow state values 19, and/or one or more packets of one or more data flows 18 can be sent to, and analyzed at, flow analysis module 140 of the flow module 100 in response to a state condition being satisfied based on the flow state values 19. For another example, as described in detail herein, a notification can be sent to other modules (e.g., a forwarding module shown in FIG. 3) of the switching device in response to a state condition being satisfied based on the flow state values 19. The other modules that receive such a notification can be triggered to take an action on the corresponding packets of data flows 18 in response to receiving the notification.

In some embodiments, one or more state conditions can be defined for different scenarios, and/or for different types of flow state values. In some embodiments, one or more state conditions can be defined as being satisfied when a flow state value 19 matches (e.g., is incremented to, is decremented to) a threshold flow state value that is predetermined within the state condition. For example, as described in detail herein, flow state value 11 can be used to represent a data packet counter for data flow 10. The first logic module 110 (e.g., a flow state advancement module) can be configured to increment flow state value 11 by one after a packet of data flow 10 is received at flow module 100. One state condition defined for such a data packet counter can be satisfied when the data packet counter is incremented to a first threshold flow state value. Accordingly, after a new packet of data flow 10 is received at flow module 100, flow state value 11 is incremented by one by the first logic module 110. If the incremented flow state value 11 is determined equal to the first threshold flow state value, as a result, a notification is sent to a forwarding module. In the same example, the second logic module 120 (e.g., a flow state timing module) can be configured to decrement flow state value 11 based on an algorithm. Another state condition defined for such a data packet counter can be satisfied when the data packet counter is decremented to a second threshold flow state value. Accordingly, the second logic module 120 decrements flow state value 11 based on the algorithm. If the decremented flow state value 11 is determined equal to the second threshold flow state value, as a result, a notification is sent to a forwarding module.

For another example, as described in detail herein, flow state value 17 can be used to represent a data packet size counter for data flow 14. In response to a packet of data flow 14 being received at flow module 100, the first logic module 110 (e.g., a flow state advancement module) can be configured to increment flow state value 17 by the size (e.g., in bits) of the received packet. One state condition defined for such a data packet size counter can be satisfied when the data packet size counter is incremented from a value less than a threshold flow state value to a value equal to or greater than the threshold flow state value. Accordingly, after a new packet of data flow 14 is received at flow module 100, flow state value 17 is incremented by the size of the received packet by the first logic module 110. If the incremented flow state value 17 is determined equal to or greater than the threshold flow state value, as a result, a notification is sent to a forwarding module.

For yet another example, as described in detail herein, flow state value 23 can be used to represent an average bandwidth counter for data flow 14. In response to a packet of data flow 14 being received at flow module 100, the first logic module 110 (e.g., a flow state advancement module) and/or the second logic module 120 (e.g., a flow state timing module) can be configured to collectively update (e.g., increment, decrement) flow state value 23. Specifically, flow state value 23 is updated based on the updated flow state value 15, which represents the total amount of time between receiving the first packet and receiving the last packet of data flow 14, and the updated flow state value 17, which represents the data packet size counter for data flow 14. One state condition defined for such an average bandwidth counter can be satisfied when the average bandwidth counter is incremented from a value less than a threshold flow state value to a value equal to or greater than the threshold flow state value. Accordingly, after a new packet of data flow 14 is received at flow module 100, flow state value 23 is updated accordingly by the first logic module 110 and/or the second logic module 120. If the updated flow state value 23 is determined to meet the corresponding state condition, as a result, a notification is sent to a forwarding module.

In some embodiments, statistics related to the flow state values 19 of the data flows 18 can be collected and used by the flow analysis module 140 to determine whether or not one or more of the data flows 18 are associated with a flow anomaly. In some embodiments, deep packet inspection, pattern matching and/or regular expression evaluation of the packet (or a data flow associated with the packet) can be performed at the flow analysis module 140. As a result, in some embodiments, a notification (e.g., a notice, an e-mail message, an indicator) can be sent (e.g., sent to other modules of the switching device, sent to a network administrator) by the flow analysis module 140.

As shown in FIG. 1, the flow state values 19 are stored in a flow state database 130 within a memory 132 of the flow module 100. The flow state values 19 can define at least a portion of the flow state database 130. In some embodiments, the memory 132 can be, for example, a random-access memory (RAM) (e.g., a dynamic RAM, a static RAM), a flash memory, a removable memory, and/or so forth. In some embodiments, the flow state database 130 can be implemented as, for example, a relational database, a table, and/or so forth. In some embodiments, the flow state values 19 can each be stored in a location within the memory 132 based on, for example, a hash of a portion of a packet associated with each of the data flows 18. For example, the flow state value 13 can be stored in a location within the memory 132 based on a hash of an L2 portion of a header of a packet from data flow 12.

As shown in FIG. 1, the data flows 18 can be from a network 170 (or a portion of a network). In some embodiments, the network 170 can be, for example, a wireless network and/or a wired network. In some embodiments, the network 170 can be, for example, associated with a data center. In such instances, the network 170 can be referred to as a data center network. In some embodiments, the flow module 100 can be disposed outside of the network 170, can be included within the network 170, or can be at an edge (e.g., within an edge device) of the network 170.

In some embodiments, one or more portions of the flow module 100 can include a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with, for example, the first logic module 110 and/or the second logic module 120 can be performed by different modules and/or combined into one or more modules. In some embodiments, the flow module 100 can be included in one or more physical units such as a rack unit or chassis.

In some embodiments, processing of the flow module 100 can be based on data units such as cells (e.g., fixed-size cells, variable-sized cells) in lieu of, or in addition to, packets. For example, the flow module 100 can be configured to process packets parsed (and/or combined) into cells that can be transmitted within, for example, a switch fabric of a data center. In some embodiments, the flow module 100 can be configured to parse (and/or combine) one or more packets into one or more cells before processing and/or sending the cell(s) to another device (not shown). In some embodiments, the flow module 100 can also be configured to reconstruct the packet(s) from the cell(s).

Figure 2:
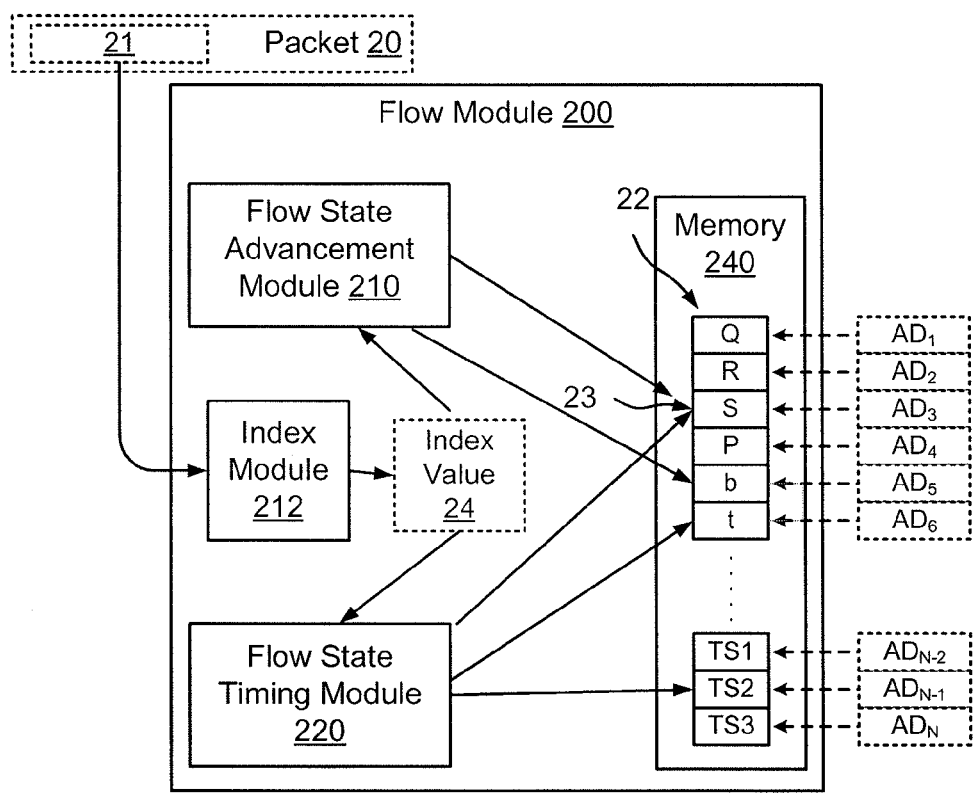
FIG. 2 is a schematic diagram that illustrates a flow module including a flow state advancement module and a flow state timing module that are configured to modify flow state values stored in a memory, according to an embodiment.

FIG. 2 is a schematic diagram that illustrates a flow module 200 including a flow state advancement module 210 and a flow state timing module 220 that are configured to modify flow state values 22 stored in a memory 240, according to an embodiment. In some embodiments, the flow state advancement module 210 and the flow state timing module 220 can, respectively, correspond with, for example, the first logic module 110 and the second logic module 120 shown in FIG. 1. As shown in FIG. 2, flow state values 22 are stored in memory locations represented by address values $AD_1$ through $AD_N$. For example, a flow state value of S is stored in the memory 240 at a memory location represented by the address $AD_3$ (represented by reference number 23). For another example, a flow state value of TS2 is stored in the memory 240 at a memory location represented by the address $AD_{N-1}$.

In some embodiments, as described herein, one or more flow state values 22 can represent a data packet counter for one or more data flows. For example, as shown in FIG. 2, each flow state value 22 stored in one of the memory locations represented by address values $AD_1$-$AD_4$ represents a data packet counter for a unique data flow. Each of flow state values Q, P, R, and S, respectively, represents a number of packets included in a data flow that are received at flow module 200. In some embodiments, as described herein, one or more flow state values 22 can represent a data packet size counter for one or more data flows. For example, as shown in FIG. 2, the flow state value b stored in the memory location represented by address value $AD_5$ represents a data packet size counter for a data flow.

In some embodiments, as described herein, one or more flow state values 22 can represent a timestamp of the last packet of one or more data flows. For example, as shown in FIG. 2, each flow state value 22 stored in one of the memory locations represented by address values $AD_{N-2}$-$AD_N$ represents a timestamp of the last packet of a unique data flow. Each of flow state values TS1, TS2, and TS3, respectively, represents a timestamp of the last packet of a data flow. In some embodiments, as described herein, one or more flow state values 22 can represent a timer that records a total amount of time between receiving the first packet and receiving the last packet of one or more data flows at flow module 200. For example, as shown in FIG. 2, the flow state value t stored in the memory location represented by address value $AD_6$ represents a timer that records the total amount of time between receiving the first packet and receiving the last packet of a data flow at flow module 200.

In some embodiments, each of the memory locations within the memory 240 can be associated with a single data flow (or single data flow type) based on a flow signature. In some embodiments, such a flow signature can be a packet signature, which is defined by (or based on) bit values of at least a portion (e.g., a header portion) of a packet of the data flow. For example, the portion 21 of the packet 20 can be used to associate the packet 20 with a data flow (not shown in FIG. 2). That is, the portion 21 of the packet 20 can be associated with (e.g., can define) a packet signature for the particular data flow that includes packet 20. In some embodiments, the portion 21 of the packet 20 can be, for example, at least a portion of a header of the packet 20, at least a portion of a payload of the packet 20, and/or at least a portion of a trailer of the packet 20. In some embodiments, the portion 21 of the packet 20 can include a source identifier and/or a destination identifier of the particular data flow that includes the packet 20.

In some embodiments, the index module 212 of the flow module 200 can perform an indexing operation based on a portion of a packet so that one or more of the memory locations from the memory 240 (which are actively being used to store one or more flow state values) can be associated with a packet signature (e.g., a L2/L3/L4 bit pattern) of the particular packet. Accordingly, a memory location from the memory 240 can be uniquely associated with (e.g., substantially uniquely associated with) a particular data flow that includes the particular packet. Thus, a flow state value 22, which is associated with the particular data flow, can be updated (e.g., incremented, decremented) at a single memory location (e.g., a single memory location from the memory 240) that is also associated with the particular data flow. For example, the index module 212 can perform an indexing operation based on the portion 21 of the packet 20 to determine an index value 24 for the packet 20, or, equivalently, for the data flow that includes the packet 20. The index value 24 can be used (e.g., by the flow state advancement module 210, by the flow state timing module 220) to identify one or more memory locations in memory 240 (e.g., the memory location represented by address $AD_3$, the memory location represented by address $AD_{N-1}$), that are associated with the data flow that includes the packet 20. As a result, the flow state values 22 stored in the identified memory locations (e.g., flow state value S, flow state value TS2) can be updated (e.g., by the flow state advancement module 210, by the flow state timing module 220) accordingly, based on the information provided by the packet 20. The flow state values 22 that are updated are associated with the data flow that includes the packet 20.

In some embodiments, the index module 212 of the flow module 200 can implement one or more methods to determine one or more index values 24 for a data flow based on a packet 20 of the data flow, and the determined index values 24 can be used to identify one or more memory locations in memory 240 that are associated with the data flow. For example, as shown in FIG. 2, the index module 212 determines at least four index values 24 based on the packet 20 of a data flow. Both the flow state advancement module 210 and the flow state timing module 220 can use the first index value 24 to select a memory location represented by address $AD_3$, where a data packet counter for the data flow is stored. Meanwhile, the flow state advancement module 210 can use the second index value 24 to select a memory location represented by address $AD_5$, where a data packet size counter for the data flow is stored. The flow state timing module 220 can use the third index value 24 to select a memory location represented by address $AD_6$, where a timer that records the total amount time between receiving the first packet and receiving the last packet of the data flow is stored. The flow state timing module 220 can use the fourth index value 24 to select a memory location represented by address $AD_{N-1}$, where a timestamp of the last packet of the data flow is stored. Additionally, in some embodiments, each index value 24 can be used to identify a unique memory location of memory 240. In some embodiments, an index value 24 can be a value representing the address of a memory location in memory 240. Alternatively, an index value 24 can be a value in other forms that can uniquely identify a memory location of memory 240.

In some embodiments, as described below in detail with respect to FIG. 6 and FIG. 7, the index module 212 can implement a hash function to determine an index value 24. Specifically, the index value 24 can be a hash value calculated based on a portion of a packet (e.g., portion 21 of packet 20). In such embodiments, the index module 212 can be a hash module (e.g., a hash module configured to implement a hash function) configured to determine an index value 24, and the flow state values 22 can be stored as a hash table in the memory 240. In some embodiments, the flow state values 22 stored in the memory 240 can collectively define a flow table. In some embodiments, the flow table can be implemented as a bloom filter (and using multiple hash functions). In some embodiments, the functionality of the index module 212 can be defined so that collisions related to index value calculations can be reduced to a desirable level. That is, the index values 24 determined by the index module 212 for a data flow are different from the index values 24 that are determined by the index module 212 for a different data flow. In some embodiments, as described with respect to FIG. 6 and FIG. 7, the index module 212 can implement more than one hash module to reduce collisions related to index value calculations.

In some embodiments, the flow state advancement module 210 can be configured to increment (e.g., increment at a single memory location) one or more of the flow state values 22 stored in the memory 240 when the flow state value(s) 22 are selected based on one or more index values 24, which are determined by the index module 212. Specifically, one of the flow state values 22 at a memory location from the memory 240 can be replaced (e.g., overwritten) at that memory location with an incremented flow state value in response to that memory location being selected by the index module 212 based on processing of a received packet. For example, as shown in FIG. 2, the flow state advancement module 210 is configured to increment the flow state value S (represented by reference number 23), which represents a data packet counter, in response to the memory location represented by address $AD_3$ being identified based on an index value 24. Specifically, when the packet 20 is received at the flow module 200, the index module 212 determines one or more index values 24 based on the portion 21 (e.g., a header portion, a trailer portion) of the packet 20. The flow state advancement module 210 selects the memory location represented by address $AD_3$ based on one of the index values 24, and then accordingly, increments the corresponding flow state value (represented by reference number 23) from S to S+1. Thus, the flow state value (represented by reference number 23), which represents the data packet counter for the data flow, is incremented by one in response to packet 20 of the data flow being received at the flow module 200.

For another example, as shown in FIG. 2, the flow state advancement module 210 is configured to increment the flow state value b, which represents a data packet size counter, in response to the memory location represented by address $AD_5$ being identified based on an index value 24. Specifically, when the packet 20 is received at the flow module 200, the index module 212 determines one or more index values 24 based on the portion 21 (e.g., a header portion, a trailer portion) of the packet 20. The flow state advancement module 210 selects the memory location represented by address $AD_5$ based on one of the index values 24, and then accordingly, increments the corresponding flow state value by the size of packet 20. Thus, the flow state value that represents the data packet size counter for the data flow is incremented accordingly in response to packet 20 of the data flow being received at the flow module 200.

In some embodiments, the flow state timing module 220 can be configured to update (e.g., change) one or more flow state values 22 when the flow state values 22 are selected based on one or more index values 24, which are determined by the index module 212. Specifically, one of the flow state values 22 at a memory location from the memory 240 can be replaced (e.g., overwritten) at that memory location with a different flow state value in response to that memory location being selected by the index module 212 based on processing of a packet. For example, as shown in FIG. 2, the flow state timing module 220 is configured to update the flow state value TS2 in response to the memory location represented by address $AD_{N-1}$ being identified based on an index value 24. Specifically, when the packet 20 is received at the flow module 200, the index module 212 determines one or more index values 24 based on the portion 21 (e.g., a header portion, a trailer portion) of the packet 20. The flow state timing module 220 selects the memory location represented by address $AD_{N-1}$ based on one of the index values 24, and then accordingly, replaces the corresponding flow state value TS2 with the timestamp of packet 20 (i.e., the time when packet 20 is received). Thus, the flow state value TS2, which represents the timestamp of the last packet of the data flow, is updated in response to packet 20 of the data flow being received at the flow module 200.

For another example, as shown in FIG. 2, the flow state timing module 220 is configured to update the flow state value t, which represents a timer that records the total amount of time between receiving the first packet and receiving the last packet of a data flow, in response to the memory location represented by address $AD_6$ being identified based on an index value 24. Specifically, when the packet 20 is received at the flow module 200, the index module 212 determines one or more index values 24 based on the portion 21 (e.g., a header portion, a trailer portion) of the packet 20. The flow state timing module 220 selects the memory location represented by address $AD_6$ based on one of the index values 24, and then accordingly, replaces the corresponding flow state value t with the updated total amount of time between receiving the first packet of the data flow and receiving packet 20 (i.e., the last packet of the data flow). Thus, the flow state value t, which represents the timer that records the total amount of time between receiving the first packet and receiving the last packet of the data flow, is updated in response to packet 20 of the data flow being received at the flow module 200.

In the example shown in FIG. 2, the flow state advancement module 210 and/or the flow state timing module 220 can be configured to collectively update a flow state value (not shown in FIG. 2) that represents an average bandwidth counter for a data flow, in response to the memory location where the average bandwidth counter is stored being identified based on an index value 24. Specifically, when the packet 20 is received at the flow module 200, the index module 212 determines one or more index values 24 based on the portion 21 (e.g., a header portion, a trailer portion) of the packet 20. As described in detail herein, the flow state advancement module 210 and the flow state timing module 220 update the flow state value representing the data packet size counter, and the flow state value representing the timer that records the total amount of time between receiving the first packet and receiving the last packet of the data flow, respectively. Subsequently, the flow state advancement module 210 and/or the flow state timing module 220 select the memory location where the average bandwidth counter is stored, and then accordingly, update the average bandwidth counter with the new value calculated based on the updated data packet size counter and timer. Thus, the flow state value, which represents the average bandwidth counter for the data flow, is updated in response to packet 20 of the data flow being received at the flow module 200.

In some embodiments, the flow state timing module 220 can be configured to decrement (e.g., decrement at a single memory location) one or more flow state values 22 based on one or more algorithms, independent of incoming packets received at the flow module 200. In some embodiments, the flow state timing module 220 can be configured to periodically decrement a flow state value 22 that represents a data packet counter for a data flow, regardless of the packets of the data flow being received at the flow module 200. As shown in the example of FIG. 2, the flow state timing module 220 can be configured to decrement the data packet counter for a data flow stored in the memory location represented by address $AD_3$, by a fixed value, after every fixed period of time. The fixed value and the fixed period of time can be predetermined in the algorithm. For example, the flow state timing module 220 can be configured to decrement a data packet counter by one after every 30 minutes. For another example, the flow state timing module 220 can be configured to decrement a data packet counter by two after every 24 hours. Similarly, in some embodiments, the flow state timing module 220 can be configured to periodically decrement a flow state value 22 that represents a data packet size counter for a data flow, regardless of the packets of the data flow being received at the flow module 200.

In some other embodiments, the flow state timing module 220 can be configured to decrement one or more flow state values 22 based on one or more algorithms, dependent of incoming packets received at the flow module 200. In some embodiments, the flow state timing module 220 can be configured to decrement a flow state value 22 that represents a data packet counter for a data flow by a fixed value, if no packet of the data flow has been received at the flow module 220 for a fixed period of time. In other words, the flow state timing module 220 can be configured to decrement a flow state value 22 representing a data packet counter for a data flow by a fixed value, after a fixed period of time since the last packet of the data flow was received at the flow module 200. The fixed value and the fixed period of time can be predetermined in the algorithm. For example, as shown in FIG. 2, the flow state timing module 220 can be configured to decrement a data packet counter for a data flow stored in the memory location represented by address $AD_3$ by one, after one hour since the last packet of the data flow was received at the flow module 200. In such embodiments, the timing information of a data flow, for example, the timestamp of the last packet of the data flow, can be stored in memory 240 as a flow state value, and can be provided to the flow state timing module 220 when needed. Similarly, in some embodiments, the flow state timing module 220 can be configured to decrement a flow state value 22 that represents a data packet size counter for a data flow by a fixed value, if no packet of the data flow has been received at the flow module 220 for a fixed period of time.

In some embodiments, a conflict preference can be used to resolve conflicts between the flow state advancement module 210 and the flow state timing module 220. For example, if the flow state advancement module 210 and the flow state timing module 220 attempt to change a flow state value from the flow state values 22 at the same time (or during the same time period), the flow module 200 can be configured to resolve the conflict based on a conflict preference. In some embodiments, the conflict preference can be defined so that it triggers the flow module 200 to, for example, allow the change by the flow state advancement module 210 and cancel the change by the flow state timing module 220 (or vice versa). In some embodiments, the conflict preference can be defined so that it triggers the flow module 200 to, for example, schedule a change by the flow state advancement module 210 before a change by the flow state timing module 220 is scheduled (or vice versa).

In some embodiments, the memory locations within the memory 240 can be initialized to one or more specified flow state values. For example, the memory locations of the memory 240 represented by addresses $AD_1$-$AD_4$ can be initialized to an initial value for a data packet counter (e.g., zero) before a packet of any data flow is received at the flow module 200. In some embodiments, one or more of the memory locations within the memory 240 can be set to a specified flow state value any time during operation of the flow module 200. For example, the memory locations within the memory 240 can be randomly, periodically, and/or so forth set to one or more specified flow state values during operation of the flow module 200. In some embodiments, a memory location (e.g., the memory location represented by address value $AD_1$) of the memory 240 can be set to a specified initial value (e.g., zero for a data packet counter) when the memory location is, for example, selected for the first time by the index module 212.

Figure 3:
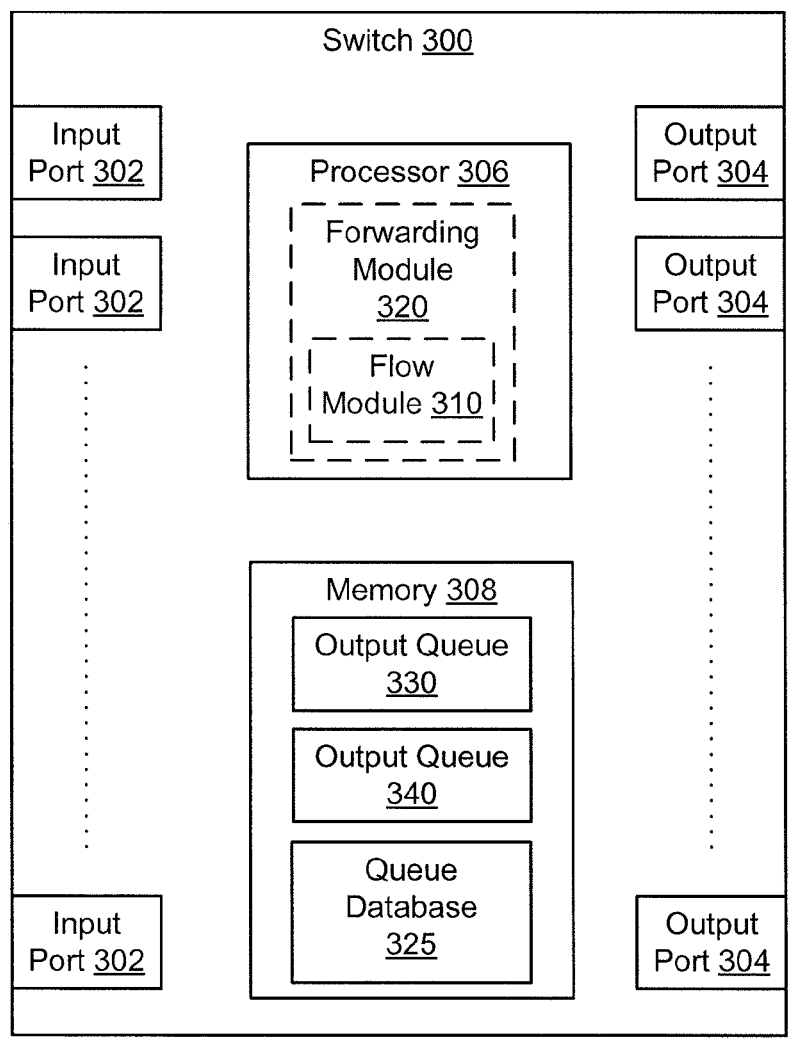
FIG. 3 is a schematic diagram that illustrates a switching device configured to forward data packets, including receiving data packets at input ports, classifying data packets into output queues, and sending data packets from output ports, according to an embodiment.

FIG. 3 is a schematic diagram that illustrates a switch 300 configured to forward data packets, which can include receiving data packets at input ports 302, classifying data packets into output queues (e.g., output queue 330, output queue 340), and sending data packets from output ports 304, according to an embodiment. The switch 300 can be any device that operatively receives data (e.g., data flows of data packets and/or data cells) from and sends data to other devices in a communication network. In some embodiments, the switch 300 can be one or more portions of a distributed switch/router within a multi-stage switch fabric (e.g., 3-stage switch fabric, 5-stage switch fabric). For example, although not shown, the switch fabric can include an ingress stage, a middle stage, and an egress stage. In some embodiments, the switch fabric can be a reconfigurably (e.g., re-arrangeably) non-blocking switch fabric and/or a time-division multiplexed switch fabric. In some embodiments, the switch fabric can be included within a data center network (e.g., a core portion of a data center network). Specifically, the switch fabric can define a core portion of the data center network, which can include a network or interconnection of devices. In some embodiments, the switch fabric can be defined based on a Clos network architecture (e.g., a strict sense non-blocking Clos network, a Benes network) that forms the data plane for a distributed switch/router system that can be included in (or can define) the core of a data center network. In some embodiments, one or more peripheral processing devices (e.g., a compute node, a storage node, a service node and/or a router)

and/or other network devices can be operatively coupled to (e.g., included within) the data center network. More details related to a switch fabric are set forth in co-pending U.S. patent application Ser. No. 12/414,825, filed Mar. 31, 2009, entitled, "Distributed Multi-Stage Switch Fabric," co-pending U.S. patent application Ser. No. 12/345,502, filed Dec. 29, 2008, entitled, "Methods and Apparatus Related to a Modular Switch Architecture," and co-pending U.S. patent application Ser. No. 12/345,500, filed Dec. 29, 2008, entitled, "System Architecture for a Scalable and Distributed Multi-Stage Switch Fabric," all of which are incorporated herein by reference in their entireties.

As shown in FIG. 3, the switch 300 can include one or more input ports 302 and one or more output ports 304. The input ports 302 and output ports 304 can be part of one or more communication interfaces and/or network interfaces (e.g., a 40 Gigabit (Gb) Ethernet interface, a 100 Gb Ethernet interface, etc.) through which the switch 300 can send data (e.g., data flows of data packets, and/or data cells) to and/or receive data from other devices in a communications network. The devices that communicate with the switch 300 can be operatively coupled to one or more input ports 302 and/or output ports 304 of the switch 300 using any suitable connection such as, for example, an optical connection (e.g., an optical cable and optical connectors), an electrical connection (e.g., an electrical cable and electrical connectors), a wireless connection (e.g., a wireless link and wireless signal transceivers) and/or the like. Similarly stated, in some embodiments, the input ports 302 and output ports 304 can implement a physical layer using twisted-pair electrical signaling via electrical cables, or fiber-optic signaling via fiber-optic cables, or wireless signaling via a wireless link between two wireless signal transceivers. In some embodiments, some of input ports 302 and/or output ports 304 implement one physical layer such as twisted-pair electrical signaling and others of input ports 302 and/or output ports 304 implement a different physical layer such as fiber-optic signaling.

Furthermore, the input ports 302 and output ports 304 can allow the switch 300 to communicate with other devices that are coupled to the switch 300, such as, for example, computer servers, via one or more communication protocols (e.g., an Ethernet protocol, a multi-protocol label switching (MPLS) protocol, a Fibre Channel protocol, a Fibre-Channel-over Ethernet protocol, an Infiniband-related protocol, etc.). In some embodiments, some of input ports 302 and/or output ports 304 implement one protocol such as Ethernet and others of input ports 302 and/or output ports 304 implement a different protocol such as Fibre Channel. Thus, the switch 300 can be in communication with multiple devices using homogeneous or heterogeneous physical layers and/or protocols via one or more input ports 302 and/or output ports 304.

In some embodiments, the switch 300 can be configured to receive every incoming packet of a given data flow at one particular input port 302, and/or to send every outgoing packet of the data flow from one particular output port 304. For example, when a communication session is established between the switch 300 and another device (e.g., a source device of a data flow, a destination device of a data flow) to transmit packets of a data flow, an input port 302 and/or an output port 304 are identified for that communication session, such that all the packets within this communication session are transmitted through the particular input port 302 and/or the particular output port 304. In some other embodiments, more than one input ports 302 and/or more than one output ports 304 can be used by the switch 300 to transmit packets of a single data flow.

In some embodiments, after receiving a packet of a data flow at one input port 302, the switch 300 can process the packet (e.g., by forwarding module 320), forward the packet to one of the output queues (e.g., output queue 330, output queue 340) based on information provided by a queue database (e.g., queue database 325), move the data packet from the output queue to one output port 304, and finally send out the packet from the output port 304. The forwarding module 320 that includes the flow module 310 is executed within the processor 306 within the switch 300. In some embodiments, one or more portions of the forwarding module 320 can include a hardware-based module (e.g., a digital signal processor (DSP), a field programmable gate array (FPGA)) and/or a software-based module (e.g., a module of computer code executed at a processor, a set of processor-readable instructions executed at a processor). In some embodiments, one or more of the functions associated with the forwarding module 320 can be performed by different modules and/or combined into one or more modules. In some embodiments, the forwarding module 320 can be included in one or more physical units such as a rack unit or chassis.

Similar to the flow module 100 described in FIG. 1 and the flow module 200 described in FIG. 2, the flow module 310 can be configured to process flow state values associated with packets of data flows that are received at one or more input ports 302. Furthermore, the forwarding module 320 can be configured to forward the packets into one or more output queues (e.g., output queue 330, output queue 340) based on the flow state values of the packets processed by the flow module 310. Details of the interaction among forwarding module 320, flow module 310, output queue 330, output queue 340, and queue database 325 are described below in connection with FIG. 4.

As shown in FIG. 3, output queue 330, output queue 340, and queue database 325 are stored within a memory 308 of the switch 300. In some embodiments, the memory 308 can be, for example, a random-access memory (RAM) (e.g., a dynamic RAM, and static RAM), a flash memory, a removable memory, and/or so forth. In some embodiments, the output queues (e.g., output queue 330, output queue 340) and the queue database (e.g., queue database 325) can be implemented as, for example, a relational database, a table, and/or so forth. In some embodiments, output queue 330, output queue 340, and queue database 325 can each be stored in one or more locations within the memory 308. In some embodiments, although not shown in FIG. 3, the switch 300 can include more than two output queues and/or more than one queue databases.

Figures 4A, 4B:
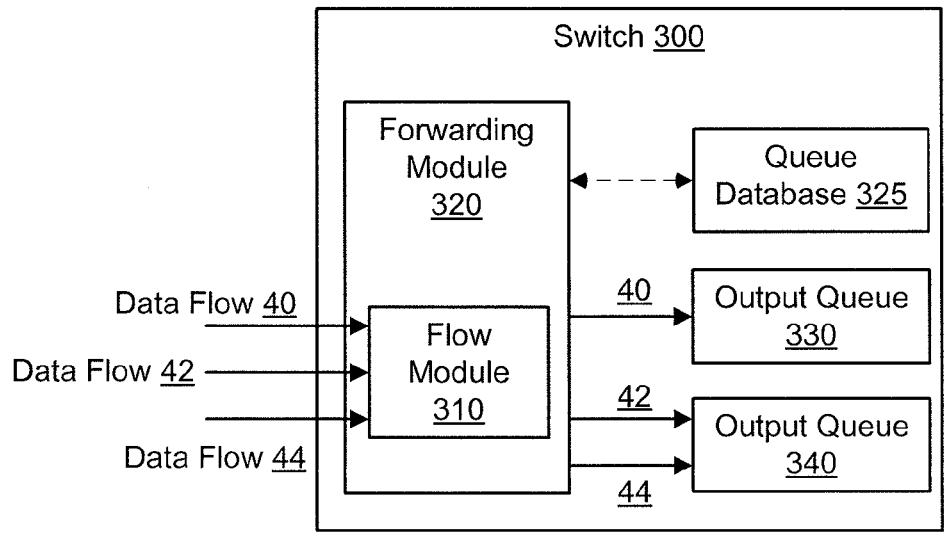
FIG. 4A is a schematic diagram that illustrates a switching device including a forwarding module configured to classify incoming data packets into output queues based on data stored in a queue database, according to an embodiment.
FIG. 4B is a schematic diagram illustrating a queue database that associates data flows with output queues, according to an embodiment.

FIG. 4A is a schematic diagram that illustrates the switch 300, including the forwarding module 320 configured to classify incoming data packets (e.g., data flow 40, data flow 42, data flow 44) into output queues (e.g., output queue 330, output queue 340) based on data stored in the queue database 325, according to an embodiment. Similar to the flow module 100 in FIG. 1 and the flow module 200 in FIG. 2, when a packet is received at the flow module 310, the flow module 310 can be configured to identify the packet as being associated with a data flow based on a signature of the packet. Note that although FIG. 4A shows the flow module 310 being within and part of the forwarding module 320, in other embodiments these modules can be separate from each other. As described in detail herein, in some embodiments, the signature of a packet can be defined by (or based on) bit values of at least a portion (e.g., a header portion) of the packet. For example, the signature of a packet can be determined based on a source identifier and/or a destination identifier that are included in a header of the packet. Specifically, the signature of the packet can be a hash value calculated from a hash function based on bit values representing the source identifier and/or the destination identifier of the packet.

In some embodiments, the signature of the packet can be a data flow ID that uniquely identifies the data flow that includes the packet. For example, as shown in FIG. 4A, the signature of a packet received at the flow module 310 can be based on a source identifier and/or destination identifier included in a header of the packet. Thus, the packet can be determined by the flow module 310 as being associated with the data flow identified by a data flow ID of data flow 40. In some other embodiments, the signature of the packet can be associated with a data flow ID that uniquely identifies the data flow that includes the packet. For example, although not shown in FIG. 4A, the switch 300 can include data structure (e.g., a table, a database) that associates each of the packet signatures with a data flow ID. Thus, a packet can be determined as being associated with a data flow, if the signature of the packet can be determined, in the data structure, as being associated with the data flow ID of the data flow.

As described in detail with respect to FIG. 1 and FIG. 2, after a received packet is identified as being associated with a data flow, the flow module 310 can identify one or more flow state values that are associated with the data flow. Furthermore, the flow module 310 can modify (e.g., increment, decrement) the flow state values associated with the data flow, in response to the packet being received at the flow module 310 and associated with the data flow. For example, after a packet is received at the flow module 310 and identified as being associated with data flow 40, the flow module 310 identifies one or more flow state values, including a flow state value representing a data packet counter for data flow 40, a flow state value representing a data packet size counter for data flow 40, a flow state value representing an average bandwidth counter for data flow 40, and a flow state value representing a timestamp of the last packet of data flow 40, etc. Furthermore, the flow module 310 is configured to increment the data packet counter for data flow 40 by one, increment the data packet size counter for data flow 40 by the size of the received packet, and update the average bandwidth counter and the timestamp of the last packet of data flow 40 accordingly. Thus, the flow state values associated with data flow 40 are updated in response to a packet of data flow 40 being received at the flow module 310.

As described in detail with respect to FIG. 3, the switch 300 includes queue database 325, output queue 330, and output queue 340 that are stored within a memory (e.g., memory 308 as shown in FIG. 3) of the switch 300. More specifically, the queue database 325 stores data associated with output queues as described in detail herein. Each of the output queues (e.g., output queue 330, output queue 340) is configured to receive one or more data packets of one or more data flows that are forwarded by the forwarding module 320, based on the data provided by queue database 325. Each output queue is then configured to temporarily store the packets, and finally send the packets to one or more output ports (e.g., output ports 304 as shown in FIG. 3) of the switch 300.

FIG. 4B is a schematic diagram illustrating the queue database 325 that associates data flows (e.g., data flow 40, data flow 42, data flow 44) with output queues (e.g., output queue 330, output queue 340), according to an embodiment. The queue database 325 can have at least two columns of entries, shown as data flow ID 350 and output queue ID 360. The first column, data flow ID 350, contains data flows IDs (e.g., 40, 42, 44), each of which uniquely identifies a data flow that is received at the switch 300. The second column, output queue ID 360, contains output queue IDs (e.g., 330, 340), each of which uniquely identifies an output queue that is used to temporarily store the packets before sending the packets to one or more output ports. Furthermore, each data flow ID in the column of data flow ID 350 is associated with one output queue ID in the column of output queue ID 360. For example, data flow 40 is associated with output queue 330, data flow 42 and data flow 44 are associated with output queue 340. The queue database 325 is used by the forwarding module 320 to determine into which output queue to move a received packet of a data flow. Specifically, the forwarding module 320 moves a received packet of a data flow into the output queue that is identified as being associated with the data flow in the queue database 325. For example, as shown in FIG. 4B, a packet of data flow 40 is moved by the forwarding module 320 into output queue 330 because data flow 40 is identified in the queue database 325 as being associated with output queue 330. Similarly, a packet of data flow 42 or data flow 44 is moved by the forwarding module 320 into output queue 340 because data flow 42 and data flow 44 are identified in the queue database 325 as being associated with output queue 340.

As described above in detail with respect to FIG. 1, one or more of the flow state values can be configured to trigger an action when a state condition is satisfied, or unsatisfied, based on the flow state values. Furthermore, in some embodiments, the state condition can be satisfied when a flow state value matches a threshold flow state value as defined within the state condition. Returning to FIG. 4A, the forwarding module 320 can be triggered to access the queue database 325, and modify data stored in the queue database 325 (e.g., data flow IDs, output queue IDs) accordingly, when one or more flow state values associated with a received packet match one or more threshold flow state values defined within the state condition. Specifically, the forwarding module 320 can be triggered to access the queue database 325, and modify (e.g., increment, decrement), delete, and/or insert one or more entries of the queue database 325 (e.g., a data flow ID, an output queue ID) that are associated with a received packet, when one or more flow state values (e.g., a data packet counter, a data packet size counter, an average bandwidth counter, a timestamp, etc.) associated with the received packet match one or more threshold flow state values (e.g., a packet number threshold, a packet size threshold, a bandwidth threshold, a time threshold, etc.).

In some embodiments, the forwarding module 320 can be triggered to change the output queue ID that is associated with a data flow in the queue database 325, when the data packet counter of the data flow is incremented to a packet number threshold in response to a packet of the data flow being received at the forwarding module 320. For example, after a packet of data flow 42 is received at the forwarding module 320, the data packet counter for data flow 42 is incremented from nine to ten, which is equal to a predetermined packet number threshold. As a result, the forwarding module 320 is triggered to change the output queue ID that is associated with data flow ID 42 from 330 to 340 (if the output queue ID is 330 when the data packet counter is nine), in the queue database 325.

In some embodiments, the forwarding module 320 can be triggered to change the output queue ID that is associated with a data flow in the queue database 325, when the data packet size counter of the data flow is incremented to cross (e.g., equal to, greater than) a packet size threshold in response to a packet of the data flow being received at the forwarding module 320. For example, after a packet of data flow 42, whose size is 20, is received at the forwarding module 320, the data packet size counter for data flow 42 is incremented from 100 to 120, which crosses a predetermined packet size threshold of 105. As a result, the forwarding module 320 is triggered to change the output queue ID that is associated with data flow ID 42 from 330 to 340 (if the output queue ID is 330 when the data packet size counter is 100), in the queue database 325.

In some embodiments, the forwarding module 320 can be triggered to change the output queue ID that is associated with a data flow in the queue database 325, when the average bandwidth counter of the data flow is incremented to cross (e.g., equal to, greater than) a bandwidth threshold in response to a packet of the data flow being received at the forwarding module 320. For example, after a packet of data flow 42 is received at the forwarding module 320, the average bandwidth counter for data flow 42 is updated from 1000 bits/second to 1100 bits/second, based on an updated data packet size counter for data flow 42 and an updated timer that records the total amount of time between receiving the first packet and receiving the last packet of data flow 42. As a result of the updated average bandwidth counter crossing a predetermined bandwidth threshold of 1050 bits/second, the forwarding module 320 is triggered to change the output queue ID that is associated with data flow ID 42 from 330 to 340 (if the output queue ID is 330 when the average bandwidth counter is 1000 bits/second), in the queue database 325.

In some embodiments, the forwarding module 320 can be triggered to change the output queue ID that is associated with a data flow in the queue database 325, when the data packet counter for the data flow is decremented to a packet number threshold in response to the data packet counter being decremented according to a predetermined schedule, where the predetermined schedule is independent of packets of the data flow being received at the forwarding module 320. For example, the flow module 310 is configured to decrement the data packet counter for data flow 42 by one (if the data packet counter for data flow 42 is greater than zero) every 30 minutes, according to a predetermined schedule, regardless of any packet of data flow 42 being received. When the data packet counter for data flow 42 is decremented from six to five, which is equal to a predetermined packet number threshold, the forwarding module 320 is triggered to change the output queue ID that is associated with data flow ID 42 from 340 to 330 (if the output queue ID is 340 when the data packet counter is six), in the queue database 325.

In some embodiments, the forwarding module 320 can be triggered to change the output queue ID that is associated with a data flow in the queue database 325, when the data packet counter for the data flow is decremented to a packet number threshold in response to the data packet counter being decremented according to a predetermined schedule, where the predetermined schedule is dependent on packets of the data flow being received at the forwarding module 320. For example, the flow module 310 is configured to decrement the data packet counter for data flow 42 by one (if the data packet counter for data flow 42 is greater than zero) every 30 minutes after the last packet of data flow 42 is received at the forwarding module 320, according to a predetermined schedule. That is, if no packet of data flow 42 has been received within 30 minutes since the last packet of data flow 42 was received, the data packet counter for data flow 42 is decremented by one, and will continuously be decremented by one every 30 minutes if no packet of data flow 42 is received during that 30 minutes. Similarly stated, when the data packet counter for data flow 42 is decremented from six to five, which is equal to a predetermined packet number threshold, the forwarding module 320 is triggered to change the output queue ID that is associated with data flow ID 42 from 340 to 330 (if the output queue ID is 340 when the data packet counter is six), in the queue database 325. In such embodiments, the forwarding module 320 is configured to determine the time when the last packet of a data flow is received at the forwarding module 320, based on the timestamp of the last packet that is stored as a flow state value associated with the data flow in the flow module 310.

In some embodiments, the forwarding module 320 can be triggered to delete an entry, including at least a data flow ID and an associated output queue ID, in the queue database 325, when the data packet counter for the data flow is decremented to a packet number threshold, or the data packet size counter for the data flow is decremented to a packet size threshold. For example, when the data packet counter of the data flow 44 is decremented from one to zero (e.g., according to a predetermined schedule), which is equal to a predetermined packet number threshold, the forwarding module 320 is triggered to delete the entry of data flow ID 44 and associated output queue ID 340 in the queue database 325.

In some embodiments, the forwarding module 320 can be triggered to define a new entry, including at least a data flow ID and an associated output queue ID, in the queue database 325, when a data packet counter or a data packet size counter for the data flow is defined and/or initialized in the flow module 310, in response to a first packet of the data flow being received at the forwarding module 320. For example, after a first packet of data flow 40 is received at the forwarding module 320, a data packet counter or data flow 40 is defined and initialized to one in the flow module 310. As a result, the forwarding module 320 is triggered to define a new entry including data flow ID 40 and associated output queue ID 330 in the queue database 325.

Returning to FIG. 3, after a packet is forwarded by the forwarding module 320 to one of the output queues (e.g., output queue 330, output queue 340) based on the data provided in the queue database 325, the packet is placed in the output queue (e.g., a queue of packets), moved to one of the output ports 304 accordingly, and finally sent to a destination device from the output port 304. In some embodiments, the output queues (e.g., output queue 330, output queue 340) can be implemented as first in, first out (FIFO) queues. In other words, a packet placed in the queue earlier than another packet is moved out of the queue (e.g., to an output port) earlier than the other packet.

In some embodiments, the output queues are configured to move packets to one or more output ports 304 at different rates. That is, one output queue can move its packets to one or more output ports at a rate different than the rate at which another output queue moves its packets to one or more output ports. For example, as shown in FIG. 3, output queue 330 can be configured to move packets to one or more output ports 304 at a rate of 10 packets per unit time (e.g., millisecond), while output queue 340 can be configured to move packets to one or more output ports 304 at a rate of 2 packets per unit time (e.g., millisecond). For another example, output queue 340 can be configured to move packets to one or more output ports 304 at a rate that is half (or, substantially half) of the rate at which output queue 330 moves packets to one or more output ports 304. In other words, during any fixed period of time, the number of packets moved by output queue 340 to one or more output ports 304 is half (or, substantially half) of the number of packets moved by output queue 330 to one or more output ports 304.

In some embodiments, an output queue with a relatively slow outgoing rate (i.e., the rate at which the output queue moves packets to one or more output ports) is intended to forward packets of data flows associated with high throughput communication connections (e.g., transfer of a large text file, bulk data, etc.). On the other hand, an output queue with a relatively fast outgoing rate is intended to forward packets of data flows associated with latency-sensitive (usually low throughput) communication connections (e.g., video streaming, control communication, etc.). Thus, packets of data flows associated with latency-sensitive communication connections can be moved from output queue(s) to output port(s) faster than packets of data flows associated with high throughput communication connections. In some embodiments, an output queue with a relatively slow outgoing rate is referred to as a low priority output queue, and an output queue with a relatively fast outgoing rate is referred to as a high priority output queue.

Figure 5:
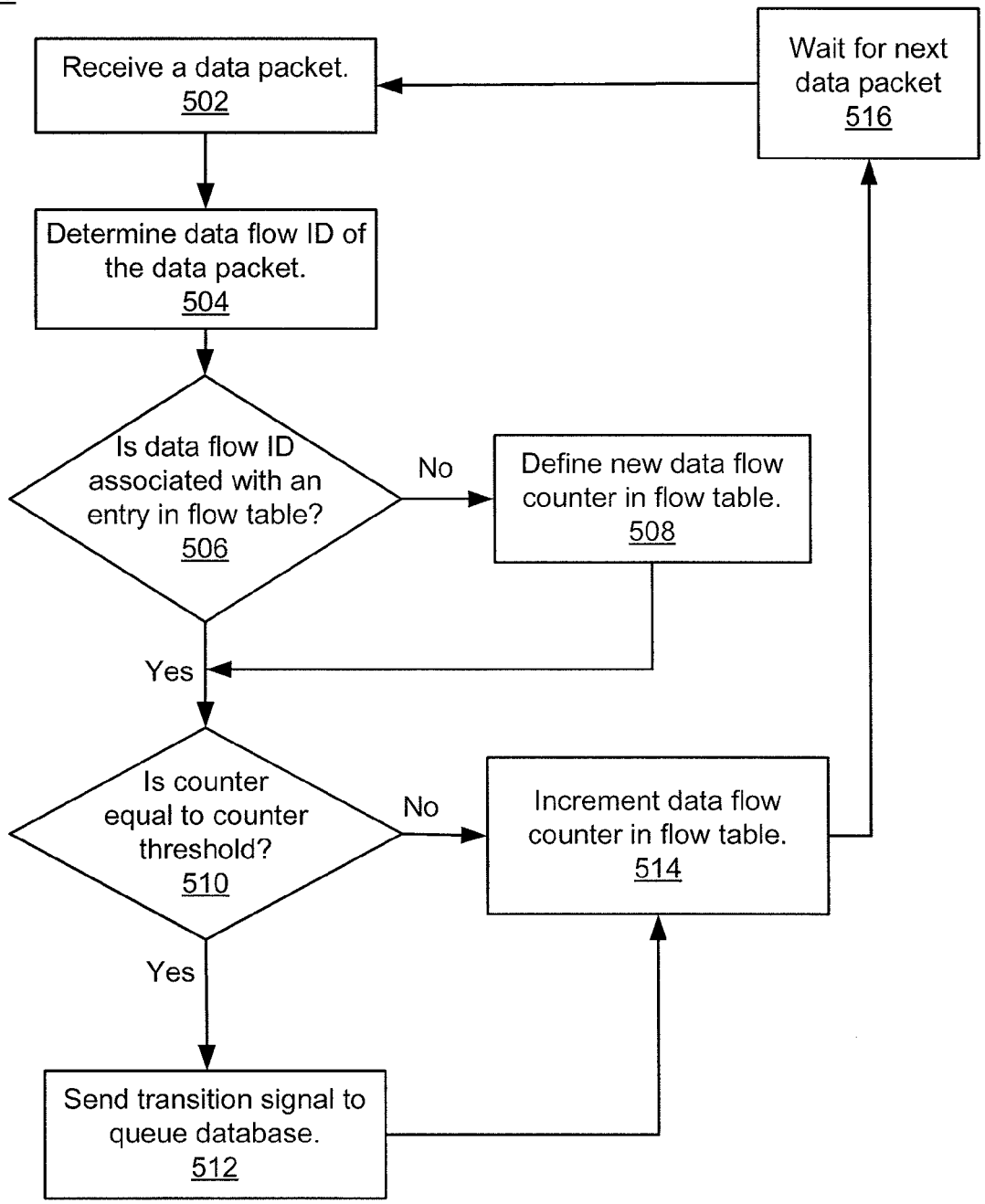
FIG. 5 is a flowchart that illustrates a method for updating a data flow counter based on a received data packet, according to an embodiment.

FIG. 5 is a flowchart that illustrates a method for updating a data flow counter (e.g., a data packet counter, a data packet size counter) based on a received data packet, according to an embodiment. At 502, a data packet can be received at a switching device. The data packet can be associated with a data flow that is originated at a source device and destined to a destination device. As described in detail with respect to FIG. 3, for example, the data packet can be received at an input port (e.g., an input port 302) of a switching device (e.g., switch 300) and then forwarded to a forwarding module (e.g., forwarding module 320) of the switching device, and/or further forwarded to a flow module (e.g., flow module 310) within the forwarding module.

At 504, a data flow ID of the received data packet can be determined. For example, as described in detail with respect to FIG. 2, an index module (e.g., index module 212) of a flow module (e.g., flow module 200) can operate an indexing operation based on a portion of the received packet (e.g., portion 21 of packet 20) to determine a data flow ID (e.g., an index value 24) for the data flow that includes the received packet. In some embodiments, the index value 24 can be a hash value calculated based on a portion of the received packet (e.g., portion 21 of packet 20) that includes a source identifier and/or a destination identifier of the data flow. In some embodiments, a data flow ID can be associated with one or more entries in a flow table that is stored in a memory within the switching device. For example, the index value 24 can be used to identify one or more flow state values stored in one or more memory locations in memory 240. In some embodiments, the index value 24 can be used to identify a data packet counter stored in the flow table that is associated with the data flow that includes the received packet.

At 506, whether the data flow ID of the received packet is associated with an entry in the flow table or not can be determined at the flow module. For example, as described above in detail with respect to FIG. 2, the flow state advancement module 210 can be configured to determine whether the index value 24 of packet 20 can be used to identify one or more flow state values associated with packet 20 (or equivalently, the data flow that includes packet 20) stored in one or more memory locations within memory 240. Specifically, the flow state advancement module 210 can be configured to determine whether the index value 24 of packet 20 can be used to identify a data packet counter associated with the data flow that includes packet 20, which is stored in a memory location within memory 240.

At 508, if the data flow ID of the received packet is determined not being associated with any entry of a data flow counter (e.g., a data packet counter, a data packet size counter) in the flow table, a new data flow counter associated with the data flow can be defined (e.g., defined, initialized) in the flow table. For example, as described above in detail with respect to FIG. 2, if the index value 24 of packet 20 is determined by the flow state advancement module 210 not being able to identify any flow state value stored in memory 240, flow state advancement module 210 indicates that no flow state value is stored in memory 240 that is associated with the data flow that includes packet 20. In other words, packet 20 is the first packet of the data flow that is received at the flow module 200. As a result, a new data packet counter associated with the data flow that includes packet 20 can be defined in a memory location (e.g., the memory location represented by address $AD_3$) within memory 240. Furthermore, the data packet counter associated with the data flow that includes packet 20 can be initialized to an initial value (e.g., zero).

At 510, if the data flow ID of the received packet is determined being associated with an entry of a data flow counter (e.g., a data packet counter, a data packet size counter) in the flow table (shown at 506), or a new data flow counter is defined in the flow table for the data flow that includes the received packet (shown at 508), the value stored in the data flow counter of the data flow can be compared against a counter threshold at the flow module. For example, as described above in detail with respect to FIG. 2, if the index value 24 of packet 20 is determined by the flow state advancement module 210 being able to identify at least one flow state value (e.g., a data packet counter, a data packet size counter) stored within memory 240, or a new data packet counter is defined and initialized (e.g., initialized to zero) in a memory location within memory 240 for the data flow that includes packet 20, then the data packet counter for the data flow that includes packet 20 is identified in a memory location (e.g., the memory location represented by address $AD_3$) within memory 240, and made available to (e.g., accessible to) the flow state advancement module 210. Next, the flow state advancement module 210 can be configured to compare the value stored in the data packet counter against a predetermined counter threshold, to determine whether the value stored in the data packet counter is equal to the predetermined counter threshold or not.

At 512, if the value stored in the data flow counter (e.g., a data packet counter, a data packet size counter) for the data flow that includes the received packet is determined equal to the counter threshold, then a transition signal can be sent to a queue database. Specifically, the transition signal can be sent from the forwarding module that receives and processes the received packet, to the queue database that stores data associated with classifying received packets into one or more output queues. Furthermore, the transition signal can be a signal causing the queue database to modify one or more entries associated with the data flow that are stored in the queue database. For example, as described above in detail with respect to FIG. 4A and FIG. 4B, if the forwarding module 320 determines that the value stored in the data packet counter for data flow 40 is equal to the predetermined counter threshold, the forwarding module 320 can be configured to send a transition signal to queue database 325, causing queue database 325 to change the output queue ID associated with data flow ID 40 from 330 to 340.

At 514, the data flow counter (e.g., a data packet counter, a data packet size counter) in the flow table, that is associated with the data flow that includes the received packet, can be incremented. For example, as described in detail with respect to FIG. 2, in response to receiving packet 20 and identifying the data packet counter for the data flow that includes packet 20 within memory 240 (e.g., stored in the memory location represented by address $AD_3$), the flow state advancement module 210 can be configured to increment the data packet counter by one.

At 516, the switching device can wait for next data packet, and upon receiving a new data packet, repeat the operations 502-514 on the received packet. For example, with respect to FIG. 2, the flow module 200 can wait for next packet after packet 20 is processed. Upon receiving a new packet, the flow module 200 and other portions of the switching device can repeat the operations 502-514, which have been performed on packet 20, on the new packet.

Figure 6:
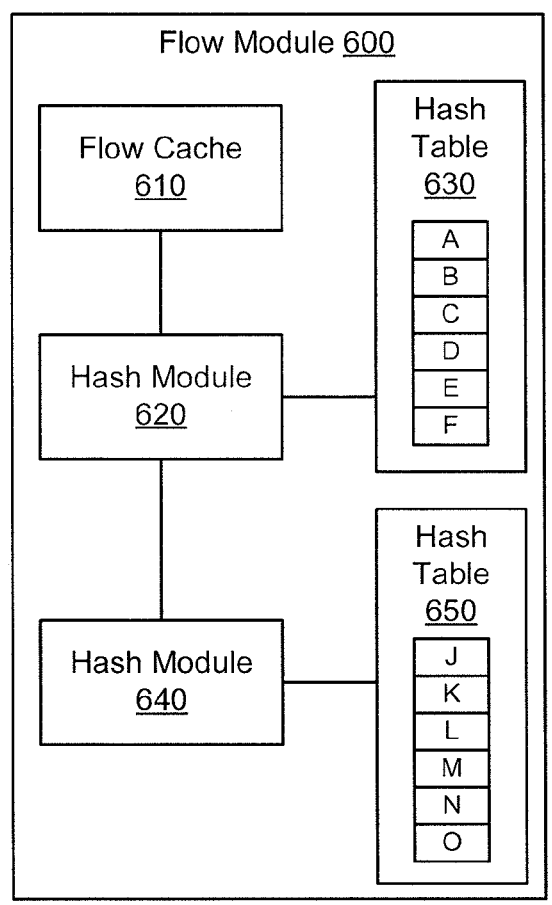
FIG. 6 is a schematic diagram that illustrates a flow module including two hash modules that are configured to collectively determine memory locations in a flow cache and two hash tables where information associated with data flows is stored, according to an embodiment.

FIG. 6 is a schematic diagram that illustrates a flow module 600 including two hash modules (i.e., hash module 620, hash module 640) that are configured to collectively determine memory locations in a flow cache (i.e., flow cache 610) and two hash tables (i.e., hash table 630, hash table 650) where information associated with data flows is stored, according to an embodiment. More specifically, as described in detail with respect to FIG. 7, hash module 620 and hash module 640 are configured to collectively determine memory locations in flow cache 610, hash table 630, and hash table 650, where information associated with one or more data flows is stored. The stored information includes flow state values (e.g., data packet counters, data packet size counters, etc.) associated with the data flows and other data related to the data flows.

In some embodiments, hash module 620 can be configured to implement a hash function to calculate a hash value based on a portion (e.g., a header portion) of a packet associated with a data flow. Furthermore, in some embodiments, a hash value can be calculated by a hash function based on a portion of a packet, which is a common potion of a packet that includes identical bit values across all packets associated with a particular data flow. As a result, the calculated hash value is identical across all packets associated with the data flow. Thus, such a calculated hash value can be used as an index value to determine a memory location in hash table 630 (if there is any memory location in hash table 630 associated with the data flow), where a flow state value (e.g., a data packet counter, a data packet size counter) associated with the data flow is stored. For example, hash module 620 can be configured to implement a hash function to calculate a hash value based on an L2 portion of a header of a packet associated with a data flow, where the L2 portion of the header includes common bit values representing an identical source identifier and/or an identical destination identifier across all packets associated with a data flow. As a result, the calculated hash value is identical across all packets associated with the data flow. Thus, the hash value is used as an index value by flow module 600 to determine a memory location in hash table 630 where a data packet counter for the data flow, or a data packet size counter for the data flow, is stored.

Similar to hash module 620, hash module 640 can also be configured to implement a hash function to calculate a hash value based on a common portion of a packet associated with a data flow, which includes identical bit values across all packets associated with a particular data flow. As a result, the calculated hash value is identical across all packets associated with the data flow, and can be used as an index value to determine a memory location in hash table 650 (if any memory location in hash table 650 is associated with the data flow), where data (e.g., a flag) associated with the data flow is stored, as described in detail herein.

In some embodiments, hash module 640 can be configured to implement a hash function different from the hash function implemented in hash module 620, based on the same common portion of a packet used by hash module 620, to produce a hash value different from the hash value produced by hash module 620. In some other embodiments, hash module 640 can be configured to implement a hash function based on a common potion of a packet that is different from the common potion of a packet used by hash module 620, to produce a hash value different from the hash value produced by hash module 620. Similar to the common portion of a packet used by hash module 620, the common portion of a packet used by hash module 640 also includes identical bit values across all packets associated with a data flow, such that the hash value produced by hash module 640 is also identical across all packets associated with the data flow. In all the embodiments described above in connection with FIG. 6, in case hash module 620 is configured to produce the same hash value for packets associated with two or more different data flows (i.e., different data flows collide in producing the same index value), hash module 640 can be configured to produce different hash values for packets associated with the different data flows, such that collisions related to index value calculations can be resolved, as described below in detail with respect to FIG. 7.

In some embodiments, flow cache 610, hash table 630, and hash table 650 can be implemented in a memory of flow module 600, wherein the memory can be, for example, a random-access memory (RAM) (e.g., a dynamic RAM, and static RAM), a flash memory, a removable memory, and/or so forth. In some embodiments, hash table 630 can be configured to store one or more flow state values (e.g., data packet counters, data packet size counters) associated with one or more data flows. The memory location of each flow state value associated with a data flow can be identified by an index value, which can be determined as a hash value by hash module 620 based on a portion of a packet associated with the data flow. For example, as shown in FIG. 6, one or more data packet counters, each representing a unique data flow respectively, can be stored within an entry (e.g., A, B, C, D, E, F) in hash table 630. Each entry of the data packet counter can be identified by an index value that is determined as a hash value by hash module 620 based on a portion of a packet associated with the corresponding data flow.

In some embodiments, hash table 650 can be configured to store one or more entries (e.g., index values), each representing a unique data flow. Similar to hash table 630, the memory location of each entry associated with a data flow can be identified by an index value, which can be determined as a hash value by hash module 640 based on a portion of a packet associated with the data flow. For example, as shown in FIG. 6, one or more index values, each representing a unique data flow respectively, can be stored within an entry (e.g., J, K, L, M, N, O) in hash table 650. Each index value within an entry can be determined as a hash value by hash module 640 based on a portion of a packet associated with the corresponding data flow.

Furthermore, in some embodiments, each data flow that is associated with one or more flow state values stored in hash table 630 is also associated with an entry stored in hash table 650, and vice versa. For example, as shown in FIG. 6, six data packet counters, each representing a unique data flow, are stored within six entries A, B, C, D, E, F in hash table 630, respectively. Meanwhile, six index values, each representing one of the same six data flows, are stored within six entries J, K, L, M, N, O in hash table 650. In such embodiments, each data flow that is associated with a flow state value stored in hash table 630 can also be identified by one entry stored in hash table 650.

Similar to hash table 630, flow cache 610 can be configured to store one or more flow state values (e.g., data packet counters, data packet size counters) associated with one or more data flows. The memory location of each flow state value associated with a data flow can be identified by an index value, which is calculated based on a portion of a packet associated with the data flow. In some embodiments, the index value can be calculated based on a common portion of a packet associated with a data flow, which includes a source identifier and/or a destination identifier that are identical across all packets of the data flow. In some embodiments, the index value can be calculated by a hash function that is different from the hash function implemented in hash module 620 or the hash function implemented in hash module 640. In such embodiments, the index values used by flow cache 610 are different from the index values used by hash table 630 (i.e., the hash values produced by hash module 620) or the index values used by hash table 650 (i.e., the hash values produced by hash module 640).

Figure 7:
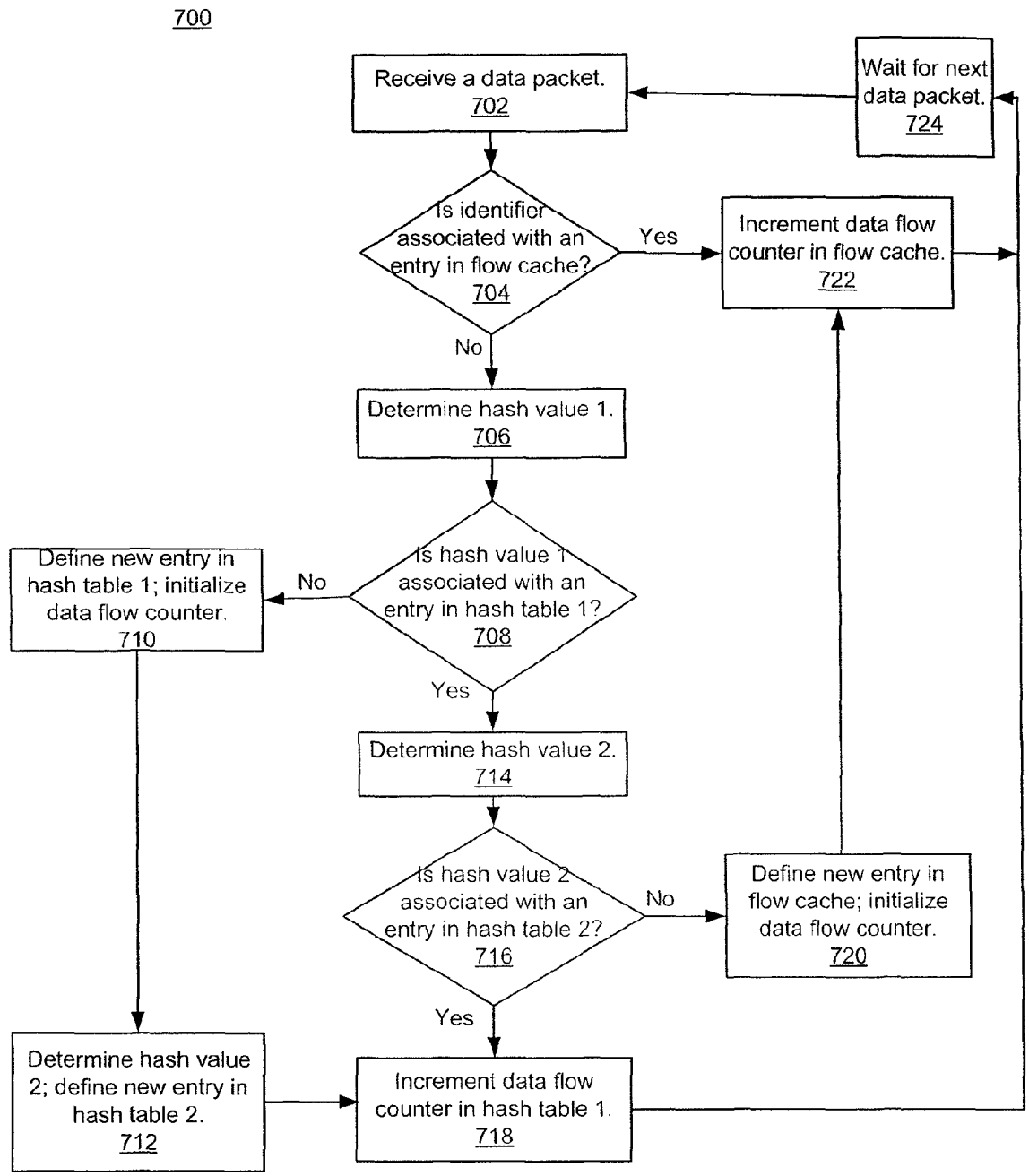
FIG. 7 is a flowchart that illustrates a method for determining a memory location where a data flow counter is stored, and updating the data flow counter based on a received data packet, according to an embodiment.

In some embodiments, as described in detail with respect to FIG. 7, flow cache 610, hash module 620, hash module 640, hash table 630, and hash table 650 can be configured to collectively resolve collisions related to index value calculations for multiple data flows. Specifically, hash module 620 can produce an index value (e.g., a hash value) for each unique data flow. In case the index values produced by hash module 620 for two or more than two data flows are identical, only one of the data flows can be associated with hash table 630. That is, flow state values of only one of the data flows can be stored in hash table 630, and identified by the index value. Furthermore, a different hash value produced by hash module 640 for the particular data flow can be stored in hash table 650. Meanwhile, flow state values of other data flows that have the same index value with the particular data flow can be stored in flow cache 610, and identified by index values that are different for each unique data flow. Thus, flow state values of each unique data flow can be uniquely identified in one or more memory locations within flow cache 610 or hash table 630.

In some embodiments, flow module 600 can be configured to define, delete, and/or modify (e.g., increment, decrement) data entries stored in flow cache 610, hash table 630, and hash table 650. For example, flow module 600 can be configured to define a new entry representing a data packet counter associated with a data flow in flow cache 610, and initialize the data packet counter to an initial value (e.g., zero). For another example, flow module 600 can be configured to increment a data packet size counter associated with a data flow that is stored in hash table 630, in response to receiving a new packet of the data flow. For yet another example, flow module 600 can be configured to delete an entry of a data packet counter associated with a data flow from hash table 630, in response to the data packet counter being decremented to a predetermined packet number threshold (e.g., zero). Accordingly, flow module 600 is configured to delete an entry of an index value associated with the data flow from hash table 650.

FIG. 7 is a flowchart that illustrates a method for determining a memory location where a data flow counter (e.g., a data packet counter, a data packet size counter) is stored, and updating the data flow counter based on a received data packet, according to an embodiment. At 702, a data packet can be received at a switching device. Specifically, a data packet can be received at a flow module (e.g., flow module 600 as shown in FIG. 6) of a switching device. The data packet can be associated with a data flow that is originated at a source device and destined to a destination device. As described above in detail with respect to FIG. 3, for example, the data packet can be received at an input port (e.g., input port 302) of a switching device (e.g., switch 300) and then forwarded to a flow module (e.g., flow module 310) of the switching device.

At 704, whether an identifier of the received packet is associated with an entry of a data flow counter in a flow cache or not can be determined. In some embodiments, the identifier of the received packet can be a data flow ID as described above in detail with respect to FIG. 5. That is, the flow module can be configured to generate an index value for the received packet (or equivalently, for the data flow that includes the received packet), based on a portion of the received packet of the data flow, which includes a source identifier and/or a destination identifier of the data flow. The flow module can be configured to determine whether the generated index value can be used to identify an entry of a data flow counter (e.g., a data packet counter, a data packet size counter) associated with the data flow in a flow cache. For example, as shown in FIG. 6, flow module 600 can be configured to generate an index value for a received packet of a data flow, based on a portion of the packet that includes a source identifier and/or a destination identifier of the data flow. Flow module 600 can be configured to determine whether the generated index value can be used to identify a data packet counter for the data flow in flow cache 610.

At 706, if the identifier of the received packet is determined not being associated with an entry of a data flow counter in the flow cache, a hash value 1 can be calculated for the received packet. Specifically, a hash value 1 can be calculated by a first hash module in the flow module based on a common portion (e.g., a header portion) of the received packet of a data flow, which includes bit values that are identical across all packets of the data flow. For example, as described above in detail with respect to FIG. 6, hash module 620 can be configured to calculate a hash value 1 based on an L2 portion of a header of the received packet associated with a data flow. The L2 portion of the header includes identical bit values representing an identical source identifier and/or an identical destination identifier across all packets of the data flow. As a result, the calculated hash value 1 is identical across all packets of the data flow. Thus, such a hash value 1 can be used as an index value to identify a memory location in hash table 630 where a flow state value (e.g., a data packet counter, a data packet size counter) associated with the data flow is stored.

At 708, whether hash value 1 of the received packet is associated with an entry in a hash table 1 or not can be determined. Specifically, the flow module can be configured to determine whether hash value 1 can be used as an index value to identify at least a memory location in hash table 1, where a flow state value (e.g., a data packet counter, a data packet size counter) associated with the data flow is stored. For example, as described above in detail with respect to FIG. 6, flow module 600 can be configured to determine whether hash value 1 calculated by hash module 620 can be used as an index value to identify a memory location in hash table 630, where a data packet counter for the data flow is stored.

At 710, if hash value 1 is determined not being associated with any entry in hash table 1, a new entry of a data flow counter (e.g., a data packet counter, a data packet size counter) associated with the data flow can be defined and initialized in hash table 1. Specifically, the flow module can be configured to define a new data flow counter in hash table 1, which is indexed by hash value 1, such that the data flow counter is associated with the data flow that includes the received packet. Furthermore, the data flow counter can be initialized to an initial value (e.g., zero). For example, as described above with respect to FIG. 6, if hash value 1 of the received packet is determined not being associated with any entry in hash table 630, flow module 600 can be configured to define a new entry of a data packet counter for the data flow that includes the received packet in hash table 630, and further initialize the data packet counter to zero.

At 712, after a new entry is defined in hash table 1, a hash value 2 can be determined for the received packet and a new entry for the data flow that includes the received packet can be defined in a hash table 2. Specifically, a hash value 2 can be calculated by a second hash module (different from the first hash module) in the flow module based on a common portion (e.g., a header portion) of the received packet of a data flow, which includes bit values that are identical across all packets of the data flow. Furthermore, the flow module can be configured to define a new entry representing the data flow in hash table 2, which can be indexed by hash value 2. For example, as described above with respect to FIG. 6, after a new entry of a data packet counter for the data flow that includes the received packet is defined in hash table 630, hash module 640 can be configured to calculate a hash value 2 based on an L2 portion of a header of the received packet. Furthermore, flow module 600 can be configured to define a new entry that includes hash value 2 in hash table 650, such that the new entry can be used to represent the particular data flow that includes the received packet. Additionally, such a new entry can be identified by hash value 2.

Referring back to 708, if hash value 1 is determined being associated with at least one entry in hash table 1, a hash value 2 can be determined for the received packet at 714. Specifically, if hash value 1 for a data flow that includes the received packet is determined being associated with an entry in hash table 1, this result indicates that the data flow that includes the received packet is either the same data flow that is associated with the entry stored in hash table 1, or a different data flow that produces the same hash value 1 as the data flow that is associated with the entry stored in hash table 1. Hash value 2 for the data flow that includes the received packet can be used to distinguish the two scenarios, as described below in detail in subsequent steps. As shown in the example of FIG. 6, if hash value 1 calculated by hash module 620 is determined being associated with a data packet counter stored in hash table 630, hash module 640 can be configured to calculate a hash value 2 based on an L2 portion of a header of the received packet.

At 716, whether hash value 2 of the received packet is associated with an entry in a hash table 2 or not can be determined. Specifically, the flow module can be configured to determine whether hash value 2 can be used as an index value to identify a memory location in hash table 2, where an identification for the data flow that includes the received packet is stored. In some embodiments, the identification for a data flow can be hash value 2 calculated for the data flow. As shown in the example of FIG. 6, flow module 600 can be configured to determine whether hash value 2 calculated by hash module 640 can be used to identify a memory location in hash table 650, where hash value 2 for the data flow that includes the received packet is stored.

At 718, if a data flow counter (e.g., a data packet counter, a data packet size counter) stored in hash table 1 can be determined being associated with the data flow that includes the received packet, the data flow counter can be incremented accordingly. Specifically, if hash value 2 for a data flow that includes the received packet is determined being associated with an entry (e.g., included in an entry) in hash table 2 (shown at 716), or an entry associated with hash value 2 for the data flow is newly defined in hash table 2 (shown at 712), this result indicates that the data flow is the same data flow that is associated with the data flow counter stored in hash table 1, which is indexed by hash value 1 for the data flow. Thus, the flow module can be configured to increment the data flow counter associated with the data flow that is stored in hash table 1 accordingly, in response to receiving the packet of the data flow. For example, as shown in FIG. 6, if hash value 2 produced by hash module 640 for a data flow that includes the received packet is identified in hash table 650, it indicates that the data flow is the same data flow that is associated with the data packet counter stored in hash table 630, which is indexed by hash value 1 produced by hash module 620 for the data flow. As a result, flow module 600 can be configured to increment the data packet counter by one in response to receiving the packet of the data flow.

Referring back to 716, if hash value 2 for a data flow that includes the received packet is determined not being associated with any entry in hash table 2, a new entry of a data flow counter (e.g., a data packet counter, a data packet size counter) associated with the data flow can be defined in the flow cache, and initialized to an initial value (e.g., zero), at 720. Specifically, if hash value 2 for a data flow that includes the received packet is determined not being associated with any entry (e.g., not included in an entry) in hash table 2, this result indicates that the data flow is different from the one that is associated with the data flow counter stored in hash table 1, which is indexed by hash value 1, even though the same hash value 1 is produced for the data flow that includes the received packet. As a result, the flow module can be configured to define a new entry of a data flow counter associated with the data flow that includes the received packet in the flow cache, and further initialize the data flow counter to an initial value (e.g., zero). For example, as shown in FIG. 6, if hash value 2 produced by hash module 640 based on a received packet cannot be identified as an entry in hash table 650, this result indicates that the data packet counter stored in hash table 630, that is indexed by hash value 1 produced by hash module 620 based on the received packet, is not associated with the data flow that includes the received packet. As a result, flow module 600 is configured to define a new data packet counter associated with the data flow that includes the received packet in flow cache 610, and initialize it to zero.

At 722, if a data flow counter (e.g., a data packet counter, a data packet size counter) stored in the flow cache is determined being associated with the data flow that includes the received packet, the data flow counter can be incremented accordingly. Specifically, if a new entry of a data flow counter associated with the data flow that includes the received packet is defined in the flow cache (shown at 720), or an identifier of the received packet is determined being associated with an existing data flow counter in the flow cache (shown at 704), the flow module can be configured to increment the data flow counter accordingly, in response to receiving the packet of the data flow. For example, as shown in FIG. 6, if a data packet counter stored in flow cache 610 is determined being associated with the data flow that includes the received packet, flow module 600 can be configured to increment the data packet counter by one, in response to receiving a packet of the data flow.

At 724, after a data flow counter (e.g., a data packet counter, a data packet size counter) associated with a data flow that is stored in hash table 1 (shown at 718) or the flow cache (shown at 722) is incremented in response to a packet of the data flow being received, the flow module can wait for next data packet. Furthermore, upon on receiving the next data packet, the flow module can be configured to repeat the operations 702-722 on the received packet. For example, as shown in FIG. 6, after a data packet counter associated with a data flow stored in hash table 630 or flow cache 610 is incremented by one in response to a packet of the data flow being received, flow module 600 waits for next data packet. Upon receiving a new data packet, flow module 600 is configured to repeat operations 702-722, which have been performed on the previous packet, on the newly-received packet.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

While shown and described above with respect to FIG. 2 as memory 240 being implemented as one memory bank, in other embodiments, the memory 240 can be implemented as multiple banks of on-chip or off-chip memory. For example, the memory 240 can be implemented as four memory banks 240a, 240b, 240c and 240d. The banks of the memory 240 can be configured to collectively store a single flow table or multiple separate flow tables. In some embodiments, two or more of the memory banks 240a, 240b, 240c and 240d may be the same size, or different sizes.

Similarly, while shown and described above with respect to FIG. 2 as flow module 200 including one instance of flow state advancement module 210 and one instance of flow state timing module 220, in other embodiments, one or more instances of the flow state timing module 220 can be used to decrement flow entries in one or more banks of the memory 240, and one or more instances of the flow state advancement module 210 can be used to decrement flow entries in one or more banks of the memory 240. Accordingly, a first flow state advancement module can be configured to increment flow state values associated with a first portion of a flow table, and a second flow state advancement module can be configured increment flow state values associated with a second portion of the flow table that is mutually exclusive from the first portion of the flow table. In some embodiments, the first flow state advancement module, and the second flow statement advancement module can be configured to operate during concurrent/parallel (or different/serial) time periods. Similarly, a first flow state timing module can be configured to decrement flow state values associated with a first portion of a flow table, and a second flow state timing module can be configured decrement flow state values associated with a second portion of the flow table that is mutually exclusive from the first portion of the flow table. In some embodiments, the first flow state timing module, and the second flow state timing module can be configured to operate during concurrent/parallel (or different/serial) time periods. Dividing the flow table (which can include tens of millions of flow entries (or potential flow entries)) in this fashion into different memory banks can be desirable if the flow table is relatively large and/or may be unmanageable (e.g., unmanageable from a timing perspective) for a single flow state advancement module and/or a single flow state timing module (as shown in FIG. 2). Furthermore, in some embodiments, a single flow state advancement module (such as flow state advancement module 210) can be specifically assigned to (e.g., dedicated to) and configured to increment the state of flow entries in more than one of the four banks of the memory 240. Similarly, a separate flow state timing module (such as flow state timing module 220) can be assigned to (e.g., dedicated to) and configured to decrement the state of flow entries in more than one of the four banks of the memory 240.

While shown and described above with respect to FIG. 1, FIG. 2, and FIG. 4A as flow state values including an average bandwidth counter, in other embodiments, a switching device can also implement one or more moving average bandwidth counters as a flow state value associated with one or more data flows. Specifically, a moving average bandwidth counter for a data flow records the moving average bandwidth occupied by packets of the data flow that have been received at a flow module within a moving period of a fixed amount of time (e.g., in the past 10 minutes, in the past hour). Such a moving average bandwidth can be updated (e.g., modified) based on a size of a new packet of the data flow received at the flow module and an amount of time between receiving that packet and receiving a previous most recent packet of the data flow.

What is claimed is:

1. An apparatus, comprising:
a processor configured to execute a forwarding module; and
the forwarding module configured to receive a plurality of first data packets having a common source identifier and a common destination identifier, the forwarding module configured to modify a data flow value counter in response to receiving each first data packet from the plurality of first data packets, the forwarding module configured to modify a value of the data flow value counter each time the forwarding module receives a data packet having the common source identifier and the common destination identifier, the forwarding module configured to store each first data packet from the plurality of first data packets in a first output queue based on the value of the data flow value counter not crossing a data flow threshold in response to the data flow value counter being modified by the forwarding module,
the forwarding module configured to receive a second data packet having the common source identifier and the common destination identifier after receiving the plurality of first data packets, the forwarding module configured to modify a data flow value counter in response to receiving the second data packet such that the value of the data flow value counter crosses the data flow threshold, the forwarding module configured to store the second data packet in a second output queue based on the value of the data flow value counter having crossed the data flow threshold.

2. The apparatus of claim 1, wherein the first output queue is a high priority output queue and the second output queue is a low priority output queue.

3. The apparatus of claim 1, wherein the data flow value counter is a data packet counter, the data packet counter configured to be incremented each time the forwarding module receives a data packet having the common source identifier and the common destination identifier.

4. The apparatus of claim 1, wherein the data flow value counter is a data packet size counter, the data packet size counter configured to be incremented by an amount associated with a size of a data packet having the common source identifier and the common destination identifier when the forwarding module receives that data packet.

5. The apparatus of claim 1, wherein the data flow value counter is a moving average bandwidth counter, the moving average bandwidth counter configured to be modified based on a size of a data packet having the common source identifier and the common destination identifier and an amount of time between receiving that data packet and receiving a previous most recent data packet having the common source identifier and the common destination identifier.

6. The apparatus of claim 1, wherein the forwarding module is configured to modify the data flow value counter by one of increasing or decreasing the data flow value each time a data packet having the common source identifier and the common destination identifier is received, the forwarding module configured to periodically modify the data flow value counter by the other of increasing or decreasing the data flow counter value.

7. A non-transitory processor-readable medium storing code representing instructions to cause a processor to:
calculate a data flow identifier associated with a first data packet based at least in part on one of a source identifier of the first data packet or a destination identifier of the first data packet;
compare a data flow counter value associated with the data flow identifier with a data flow threshold;
send, at a time and in response to comparing the data flow counter value with the data flow threshold, a transition signal such that a forwarding module stores, after the time, the first data packet in a first output queue based on the data flow identifier, the forwarding module configured to store, prior to the time, a second data packet in a second output queue based on the data flow identifier; and
modify the data flow counter value in response to comparing the data flow counter value.

8. The non-transitory processor-readable medium of claim 7, wherein the code representing instructions to cause the processor to calculate the data flow identifier includes code representing instructions to cause the processor to calculate the data flow identifier using at least one of the source identifier or the destination identifier as an input to a hash function.

9. The non-transitory processor-readable medium of claim 7, wherein the first output queue is a low priority output queue and the second output queue is a high priority output queue.

10. The non-transitory processor-readable medium of claim 7, wherein the data flow counter value is a data packet counter value, the code representing instructions to cause the processor to modify the data flow counter value includes code representing instructions to cause the processor to increment the data packet counter value in response to comparing the data flow counter value.

11. The non-transitory processor-readable medium of claim 7, wherein the data flow counter value is a data packet size counter value, the code representing instructions to cause the processor to modify the data flow counter value includes code representing instructions to cause the processor to increment the data packet size counter value by an amount associated with a size of the first data packet.

12. The non-transitory processor-readable medium of claim 7, wherein the data flow counter value is a moving average bandwidth counter value, the code representing instructions to cause the processor to modify the data flow counter value includes code representing instructions to cause the processor to modify the moving average bandwidth counter value based on a size of the first data packet and an amount of time between receiving the first data packet and receiving a previous most recent data packet having the source identifier and the destination identifier.

13. The non-transitory processor-readable medium of claim 7, wherein the code representing instructions to cause the processor to modify the data flow counter value includes code representing instructions to modify the data flow counter value by one of increasing or decreasing the data flow counter value in response to comparing the data flow counter value, the non-transitory processor-readable medium further comprising code representing instructions to cause the processor to:
periodically modify the data flow counter value by the other of increasing or decreasing the data flow counter value.

14. An apparatus, comprising:
a processor configured to execute a forwarding module and a flow module;
the forwarding module configured to store a first data packet from a plurality of data packets in a first output queue when the forwarding module is in a first configuration, each data packet from the plurality of data packets having a common source identifier and a common destination identifier of the remaining data packets from the plurality of data packets, the forwarding module configured to store a second data packet from the plurality of data packets in a second output queue when the forwarding module is in a second configuration; and
the flow module configured to store a data flow counter value indicating a characteristic of the plurality of data packets, the flow module configured to modify the data flow counter value each time a data packet from the plurality of data packets is received, the flow module configured to send a transition signal when the data flow counter value crosses a data flow threshold, the forwarding module configured to change from the first configuration to the second configuration in response to receiving the transition signal.

15. The apparatus of claim 14, wherein the first output queue is a high priority output queue and the second output queue is a low priority output queue.

16. The apparatus of claim 14, wherein the data flow counter value is a data packet counter value, the flow module configured to increment the data packet counter value each time the forwarding module receives a data packet from the plurality of data packets.

17. The apparatus of claim 14, wherein the data flow counter value is a data packet size counter value, the flow module configured to increment the data packet size counter value by an amount associated with a size of a data packet from the plurality of data packets when the forwarding module receives that data packet.

18. The apparatus of claim 14, wherein the data flow counter value is a moving average bandwidth counter value, the flow module configured to modify the moving average bandwidth counter value based on a size of a data packet from the plurality of data packets and an amount of time between receiving that data packet and receiving a previous most recent data packet from the plurality of data packets.

19. The apparatus of claim 14, wherein the flow control module is configured to send the transition signal when the data flow counter value crosses the data flow threshold and the forwarding module is in the first configuration, the flow control module configured to not send the transition signal when the data flow counter value crosses the data flow threshold and the forwarding module is in the second configuration.

20. The apparatus of claim 14, wherein the flow module is configured to modify the data flow counter value by one of increasing or decreasing the data flow counter value each time a data packet from the plurality of data packets is received, the flow module configured to periodically modify the data flow counter value by the other of increasing or decreasing the data flow counter value.

* * * * *